(12) United States Patent
Hyde et al.

(10) Patent No.: US 9,681,311 B2
(45) Date of Patent: Jun. 13, 2017

(54) PORTABLE WIRELESS NODE LOCAL COOPERATION

(71) Applicant: Elwha LLC, Bellevue, WA (US)

(72) Inventors: Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 13/945,801

(22) Filed: Jul. 18, 2013

(65) Prior Publication Data
US 2014/0349630 A1 Nov. 27, 2014

Related U.S. Application Data

(63) Continuation-in-part of application No. 13/936,921, filed on Jul. 8, 2013, which is a continuation-in-part of application No. 13/904,970, filed on May 29, 2013, which is a continuation-in-part of application No. 13/902,585, filed on May 24, 2013, which is a continuation-in-part of application No. 13/842,040, filed on Mar. 15, 2013, now Pat. No. 9,608,862.

(51) Int. Cl.
*H04W 24/02* (2009.01)
*H04B 7/026* (2017.01)

(52) U.S. Cl.
CPC ............ *H04W 24/02* (2013.01); *H04B 7/026* (2013.01)

(58) Field of Classification Search
CPC .................. H04W 24/02; H04B 7/026
USPC .......................... 370/254, 334, 339
See application file for complete search history.

(56) References Cited

U.S. PATENT DOCUMENTS 5,347,286 A  9/1994 Babitch
5,515,059 A * 5/1996 How ................. H01Q 3/44
                                        342/372

(Continued)

FOREIGN PATENT DOCUMENTS

CN    102790277 A    11/2012
EP    1 124 391 A1    8/2001

(Continued)

OTHER PUBLICATIONS

PCT International Search Report; International App. No. PCT/US2014/027741; Jul. 28, 2014; 5 pages.

(Continued)

*Primary Examiner* — Mohammad Anwar

(57) ABSTRACT

Disclosed herein are example embodiments for local cooperation between or among portable wireless nodes. For certain example embodiments, at least one device, such as a portable wireless node: (i) may identify at least one cooperative portable wireless node to participate in an antenna assembly configuration parameter architecture; or (ii) may communicate with at least one cooperative portable wireless node to share one or more antenna assembly configuration parameters that are associated with at least one orientation position of at least one portable wireless node. However, claimed subject matter is not limited to any particular described embodiments, implementations, examples, or so forth.

42 Claims, 26 Drawing Sheets

(56) References Cited

U.S. PATENT DOCUMENTS

| | | | |
|---|---|---|---|
| 6,122,524 A * | 9/2000 | Goerke | H04B 7/18571 333/129 |
| 6,571,097 B1 | 5/2003 | Takai | |
| 6,954,180 B1 | 10/2005 | Braun et al. | |
| 6,980,782 B1 * | 12/2005 | Braun et al. | 455/277.2 |
| 7,068,234 B2 | 6/2006 | Sievenpiper | |
| 7,106,715 B1 | 9/2006 | Kelton et al. | |
| 7,688,306 B2 | 3/2010 | Wehrenberg et al. | |
| 7,911,386 B1 | 3/2011 | Itoh et al. | |
| 7,978,063 B2 | 7/2011 | Baldus et al. | |
| 8,159,399 B2 | 4/2012 | Dorsey et al. | |
| 8,217,843 B2 | 7/2012 | Shtrom et al. | |
| 8,280,427 B2 | 10/2012 | Wang et al. | |
| 8,494,558 B2 | 7/2013 | Jonsson et al. | |
| 8,548,525 B2 * | 10/2013 | Wong et al. | 455/562.1 |
| 8,577,392 B1 | 11/2013 | Pai et al. | |
| 8,618,937 B2 | 12/2013 | Rofougaran et al. | |
| 8,792,414 B2 | 7/2014 | Kish | |
| 2002/0147032 A1 | 10/2002 | Yoon et al. | |
| 2003/0090418 A1 * | 5/2003 | Howell | 342/377 |
| 2004/0198401 A1 | 10/2004 | Rodgers et al. | |
| 2004/0204026 A1 | 10/2004 | Steer et al. | |
| 2004/0259497 A1 | 12/2004 | Dent | |
| 2005/0195103 A1 | 9/2005 | Davis et al. | |
| 2005/0250543 A1 | 11/2005 | Thermond | |
| 2006/0017692 A1 | 1/2006 | Wehrenberg et al. | |
| 2006/0052112 A1 * | 3/2006 | Baussi et al. | 455/456.1 |
| 2006/0148405 A1 | 7/2006 | Wu et al. | |
| 2006/0232468 A1 | 10/2006 | Parker et al. | |
| 2007/0063911 A1 | 3/2007 | Davidson et al. | |
| 2008/0074307 A1 | 3/2008 | Boric-Lubecke et al. | |
| 2008/0077326 A1 | 3/2008 | Funk et al. | |
| 2008/0096566 A1 | 4/2008 | Brunner et al. | |
| 2008/0242354 A1 | 10/2008 | Rofougaran | |
| 2008/0258971 A1 | 10/2008 | Nichols et al. | |
| 2008/0274712 A1 * | 11/2008 | Rofougaran | H01P 1/20372 455/333 |
| 2008/0304425 A1 | 12/2008 | Karaoguz | |
| 2008/0311851 A1 | 12/2008 | Hansen et al. | |
| 2009/0047950 A1 | 2/2009 | Doppler et al. | |
| 2009/0117858 A1 | 5/2009 | Furrer et al. | |
| 2009/0212941 A1 | 8/2009 | Vock et al. | |
| 2009/0325479 A1 | 12/2009 | Chakrabarti et al. | |
| 2010/0027518 A1 * | 2/2010 | Wang | H04W 16/18 370/338 |
| 2010/0080177 A1 * | 4/2010 | Rofougaran | H04W 76/025 370/329 |
| 2010/0177664 A1 * | 7/2010 | Thoumy et al. | 370/254 |
| 2010/0188331 A1 | 7/2010 | Wehrenberg et al. | |
| 2010/0194655 A1 | 8/2010 | Cook | |
| 2010/0194663 A1 * | 8/2010 | Rothwell | H01Q 9/0442 343/876 |
| 2010/0211777 A1 | 8/2010 | Ishihara et al. | |
| 2010/0231453 A1 | 9/2010 | Shinkai et al. | |
| 2010/0231473 A1 | 9/2010 | Shtrom et al. | |
| 2010/0279751 A1 | 11/2010 | Pourseyed et al. | |
| 2010/0297953 A1 | 11/2010 | Rofougaran | |
| 2010/0309872 A1 * | 12/2010 | Amini | H04L 12/413 370/329 |
| 2011/0009105 A1 * | 1/2011 | Lee | H01Q 9/0407 455/418 |
| 2011/0063168 A1 | 3/2011 | Skarp | |
| 2011/0090113 A1 | 4/2011 | Fenton | |
| 2011/0105184 A1 | 5/2011 | Piirainen et al. | |
| 2011/0143746 A1 | 6/2011 | Lehser | |
| 2011/0151931 A1 | 6/2011 | Kish et al. | |
| 2011/0175672 A1 | 7/2011 | Nguyen et al. | |
| 2011/0201357 A1 | 8/2011 | Garrett et al. | |
| 2011/0207444 A1 | 8/2011 | Hansen et al. | |
| 2011/0210787 A1 * | 9/2011 | Lee | H03F 1/56 330/126 |
| 2011/0250928 A1 | 10/2011 | Schlub et al. | |
| 2011/0273359 A1 | 11/2011 | Tischer et al. | |
| 2011/0298672 A1 | 12/2011 | Otto et al. | |
| 2011/0305175 A1 | 12/2011 | Hethuin et al. | |
| 2011/0306306 A1 | 12/2011 | Reed | |
| 2012/0009942 A1 | 1/2012 | Zoubir | |
| 2012/0014367 A1 * | 1/2012 | Caillerie et al. | 370/345 |
| 2012/0021693 A1 * | 1/2012 | Wintzell et al. | 455/67.11 |
| 2012/0056784 A1 | 3/2012 | Xie et al. | |
| 2012/0157120 A1 | 6/2012 | Hansen et al. | |
| 2012/0182867 A1 | 7/2012 | Farrag et al. | |
| 2012/0194399 A1 * | 8/2012 | Bily et al. | 343/772 |
| 2012/0202560 A1 | 8/2012 | Donaldson | |
| 2012/0299772 A1 | 11/2012 | Shtrom et al. | |
| 2013/0040655 A1 | 2/2013 | Keidar | |
| 2013/0045759 A1 | 2/2013 | Smith | |
| 2013/0053061 A1 | 2/2013 | Kang et al. | |
| 2013/0078908 A1 | 3/2013 | Smith | |
| 2013/0176161 A1 | 7/2013 | Derham et al. | |
| 2013/0184022 A1 | 7/2013 | Schmidt | |
| 2013/0207806 A1 | 8/2013 | Lehmann | |
| 2014/0051461 A1 | 2/2014 | Ranki et al. | |
| 2014/0113671 A1 * | 4/2014 | Schwengler | 455/517 |
| 2014/0120947 A1 | 5/2014 | Siomina | |
| 2014/0153418 A1 | 6/2014 | Hariharan et al. | |
| 2014/0211677 A1 | 7/2014 | Barbieri et al. | |
| 2014/0274112 A1 | 9/2014 | Vitek et al. | |
| 2014/0306843 A1 | 10/2014 | Merkel et al. | |
| 2015/0030256 A1 | 1/2015 | Brady et al. | |

FOREIGN PATENT DOCUMENTS

| | | |
|---|---|---|
| EP | 1 369 954 A3 | 10/2004 |
| EP | 1 562 257 A1 | 8/2005 |
| EP | 2 334 113 A1 | 6/2011 |
| KR | 2003-0019814 | 3/2003 |
| WO | WO 98/29968 A2 | 7/1998 |
| WO | WO 2007/090424 A1 | 8/2007 |
| WO | WO 2012/050614 A1 | 4/2012 |

OTHER PUBLICATIONS

Brown, Michael; "Meet 60Ghz Wi-Fi, the insanely fast future of wireless networking," PC World; http://www.pcworld.com/article/2030041/meet-60ghz-wi-fi-the-insanely-fast-future-of-wireless-networking.html, Mar. 6, 2013.

Teral, Stephanie; "Mobile Spectrum, Annual Market Size and Forecasts Analysis", Infonetics Research Inc., Feb. 18, 2013, pp. i-23.

Cisco, "Cisco Wireless LAN Controller Configuration Guide", Software Release 7.0; bearing a date of Jun. 2010; pp. 1-2, 4-68, 4-116, 7-17 and 12-34.

Nokia Corporation; "Linux Cross Reference"; Version 4.0; downloaded on May 28, 2015; pp. 1-24; Copyright © 2009 Nokia Corporation.

European Patent Office, Supplementary European Search Report, Pursuant to Rule 62 EPC; App. No. EP 14 76 3930.6; Oct. 17, 2016; pp. 1-8.

* cited by examiner

| FIG. 1A | FIG. 1B | FIG. 1C | FIG. 1D |
| FIG. 1E | FIG. 1F | FIG. 1G | FIG. 1H |
| FIG. 1I | FIG. 1J | FIG. 1K | FIG. 1L |

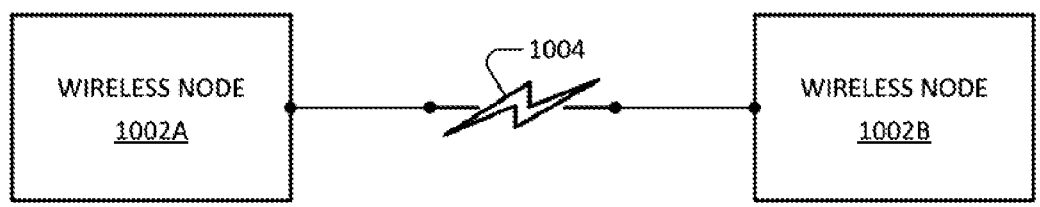

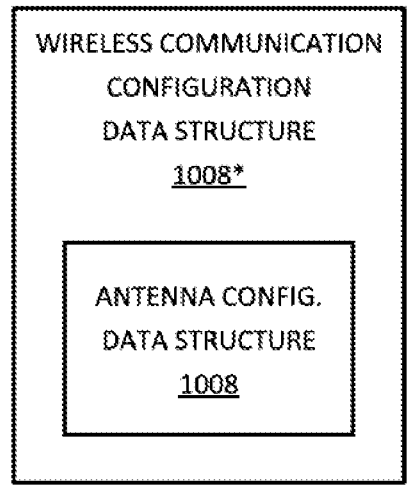
FIG. 1L     1000L

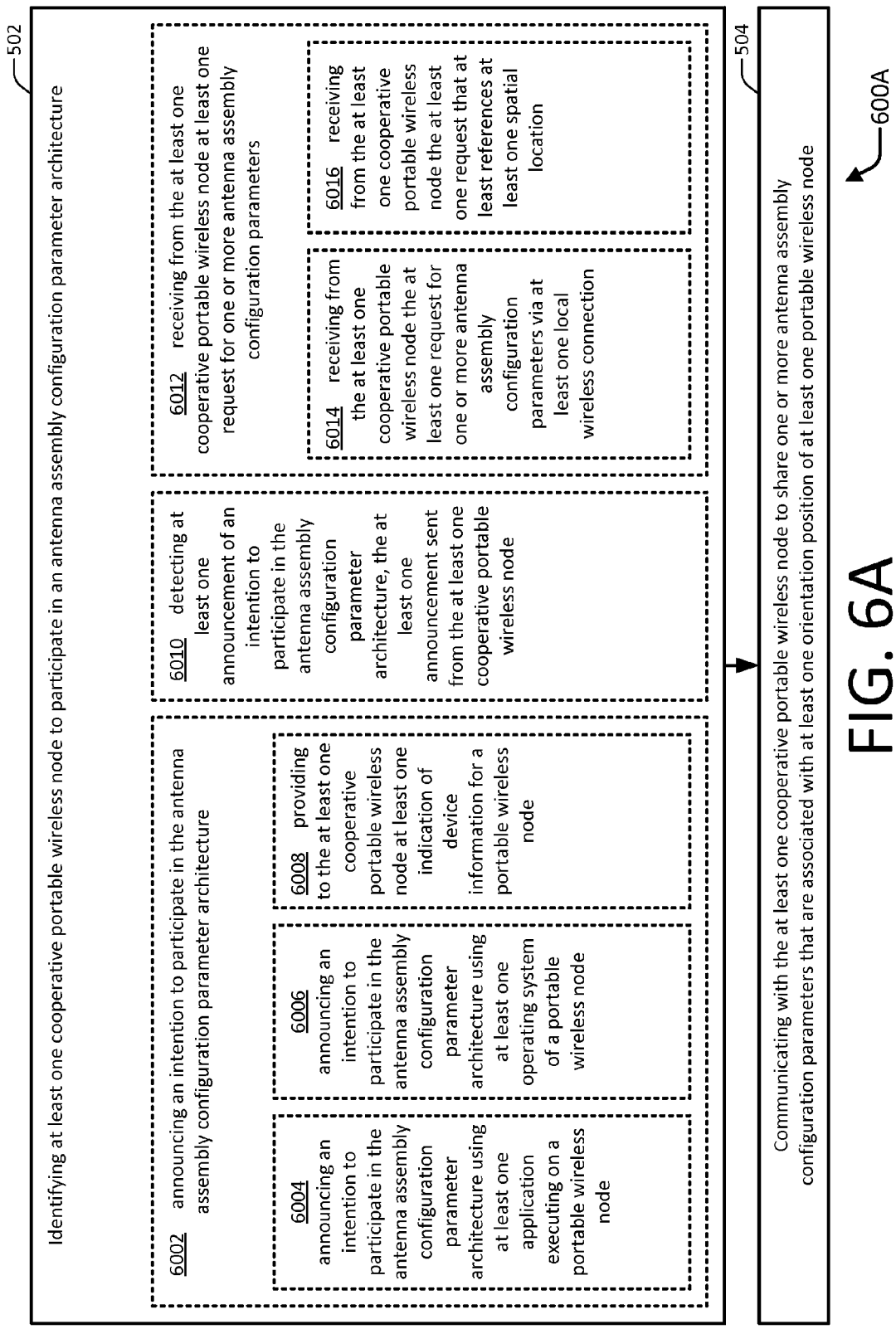

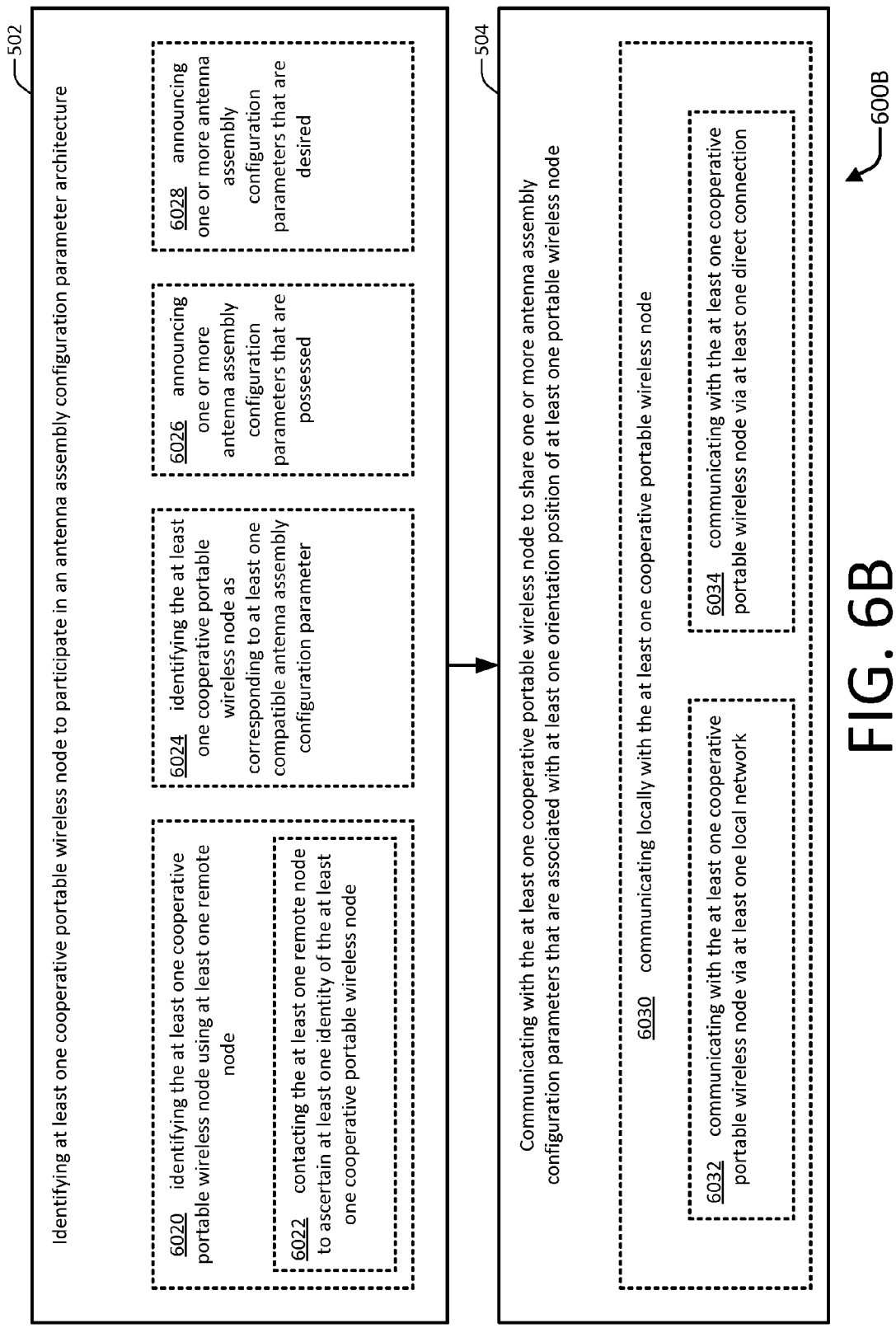

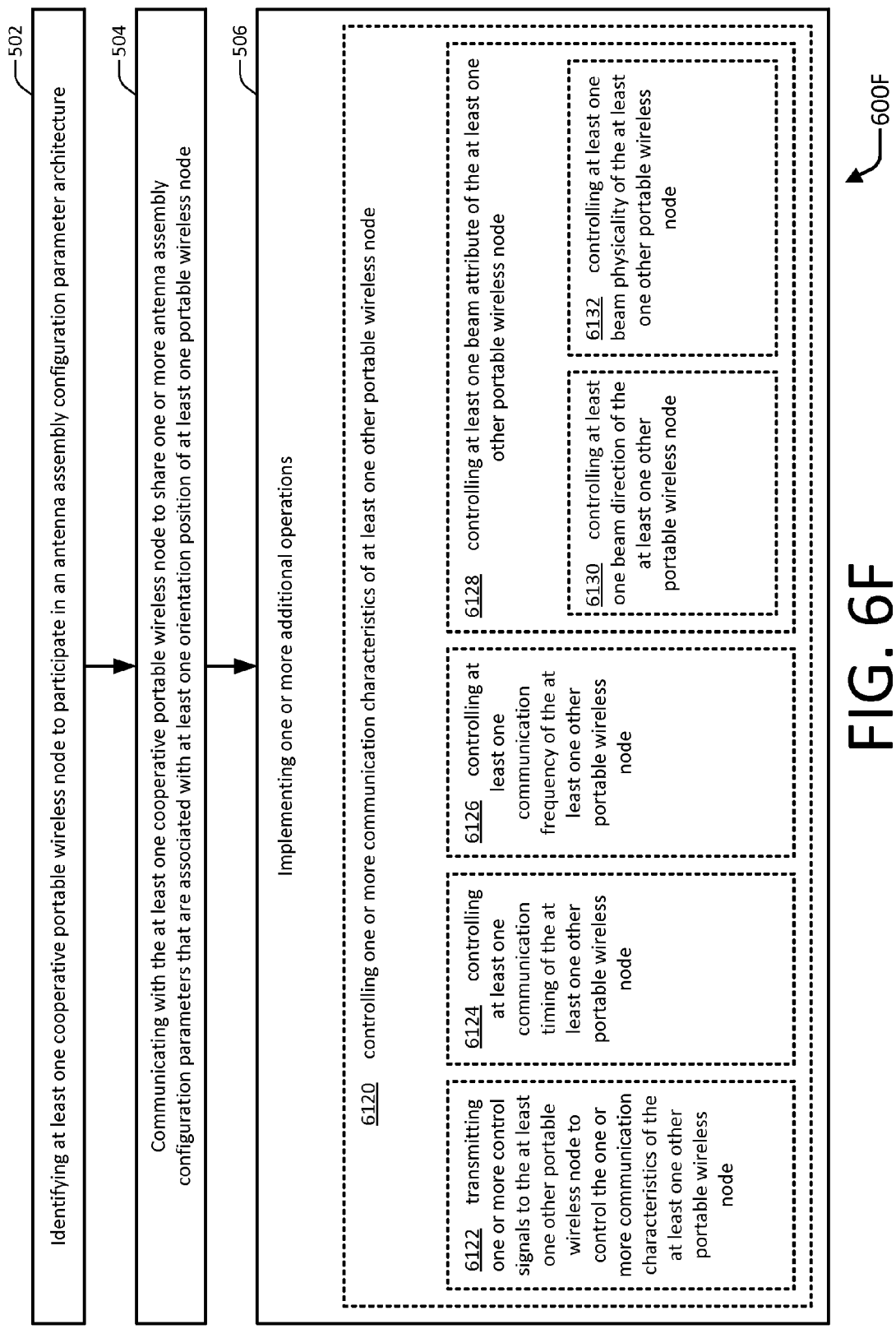

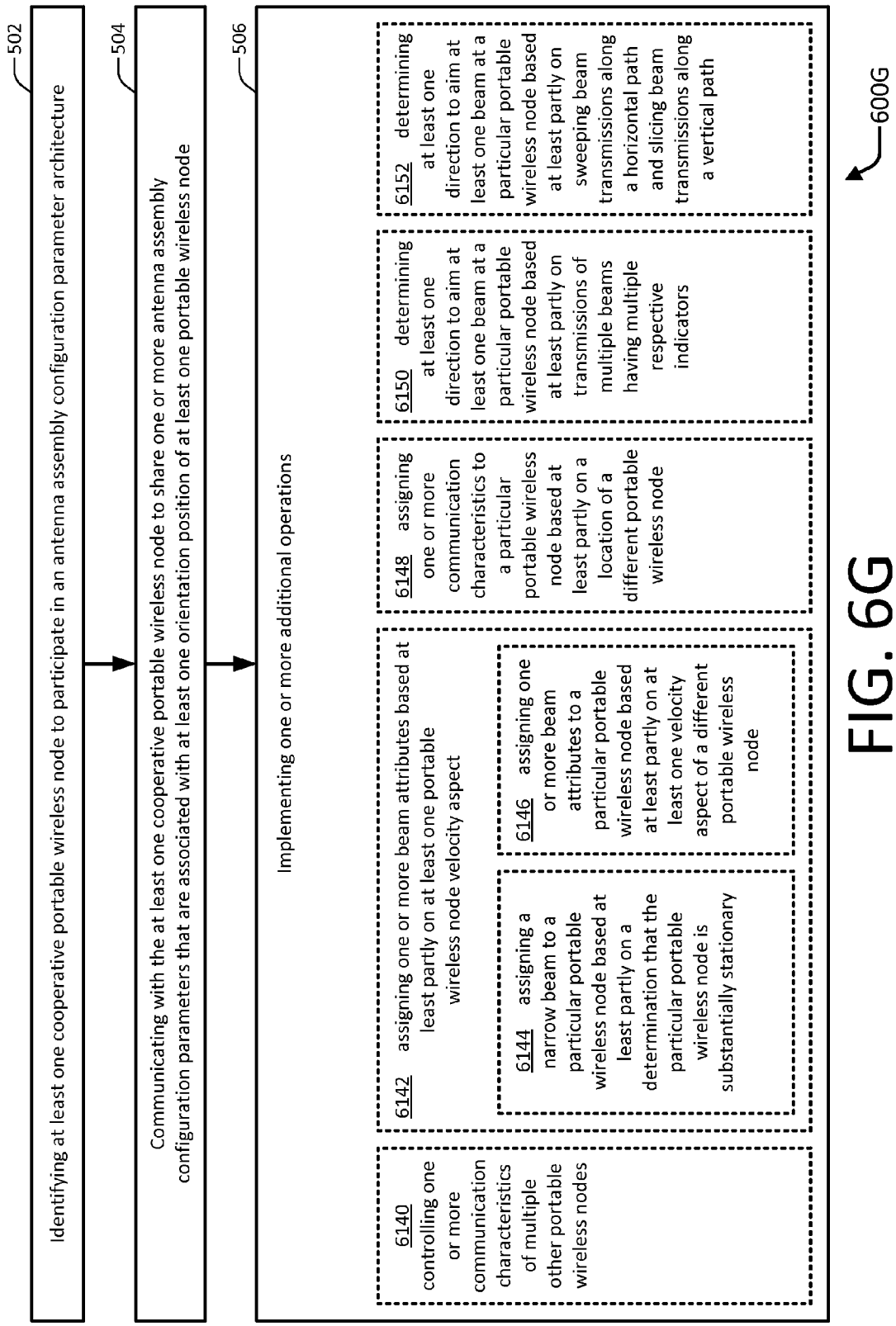

PORTABLE WIRELESS NODE LOCAL COOPERATION

PRIORITY APPLICATIONS (1) For purposes of the USPTO extra-statutory requirements, the present application constitutes a continuation-in-part of U.S. patent application Ser. No. 13/842,040, entitled "Frequency Accommodation", naming Roderick A. Hyde, Royce A. Levien, Richard T. Lord, Robert W. Lord, Mark A. Malamud, and Clarence T. Tegreene as inventors, filed 15 Mar. 2013, which is currently co-pending or is an application of which a currently co-pending application is entitled to the benefit of the filing date.

(2) For purposes of the USPTO extra-statutory requirements, the present application constitutes a continuation-in-part of U.S. patent application Ser. No. 13/902,585, entitled "Facilitating Wireless Communication in Conjunction with Orientation Position", naming Roderick A. Hyde, Royce A. Levien, Richard T. Lord, Robert W. Lord, Mark A. Malamud, and Clarence T. Tegreene as inventors, filed 24 May 2013, which is currently co-pending or is an application of which a currently co-pending application is entitled to the benefit of the filing date.

(3) For purposes of the USPTO extra-statutory requirements, the present application constitutes a continuation-in-part of U.S. patent application Ser. No. 13/904,970, entitled "Facilitating Wireless Communication in Conjunction with Orientation Position", naming Roderick A. Hyde, Royce A. Levien, Richard T. Lord, Robert W. Lord, Mark A. Malamud, and Clarence T. Tegreene as inventors, filed 29 May 2013, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/936,921, entitled "Supporting Antenna Assembly Configuration Network Infrastructure", naming Roderick A. Hyde, Royce A. Levien, Richard T. Lord, Robert W. Lord, Mark A. Malamud, and Clarence T. Tegreene as inventors, filed 8 Jul. 2013, which is currently co-pending or is an application of which a currently co-pending application is entitled to the benefit of the filing date.

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

RELATED APPLICATIONS

None

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BRIEF DESCRIPTION OF THE FIGURES

FIGS. 1B-1L are individual schematic diagrams that may be combined to form a joint schematic diagram illustrating example implementations for accommodating one or more different frequencies in a wireless environment in accordance with certain example embodiments.

FIGS. 6A-6G depict example additions or alternatives for a flow diagram of FIG. 5 in accordance with certain example embodiments.

DETAILED DESCRIPTION

Figure 1:
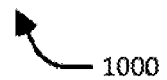
FIG. 1 is a block diagram indicative of a spatial relationship or interconnectedness of drawing sheets that respectively correspond to FIGS. 1A-1L, which together depict at least an example enviro-system related to certain example embodiments.
Figure 1A:
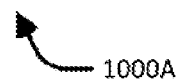
FIG. 1A is a schematic diagram of example wireless nodes in accordance with certain example embodiments.
Figure 1B:
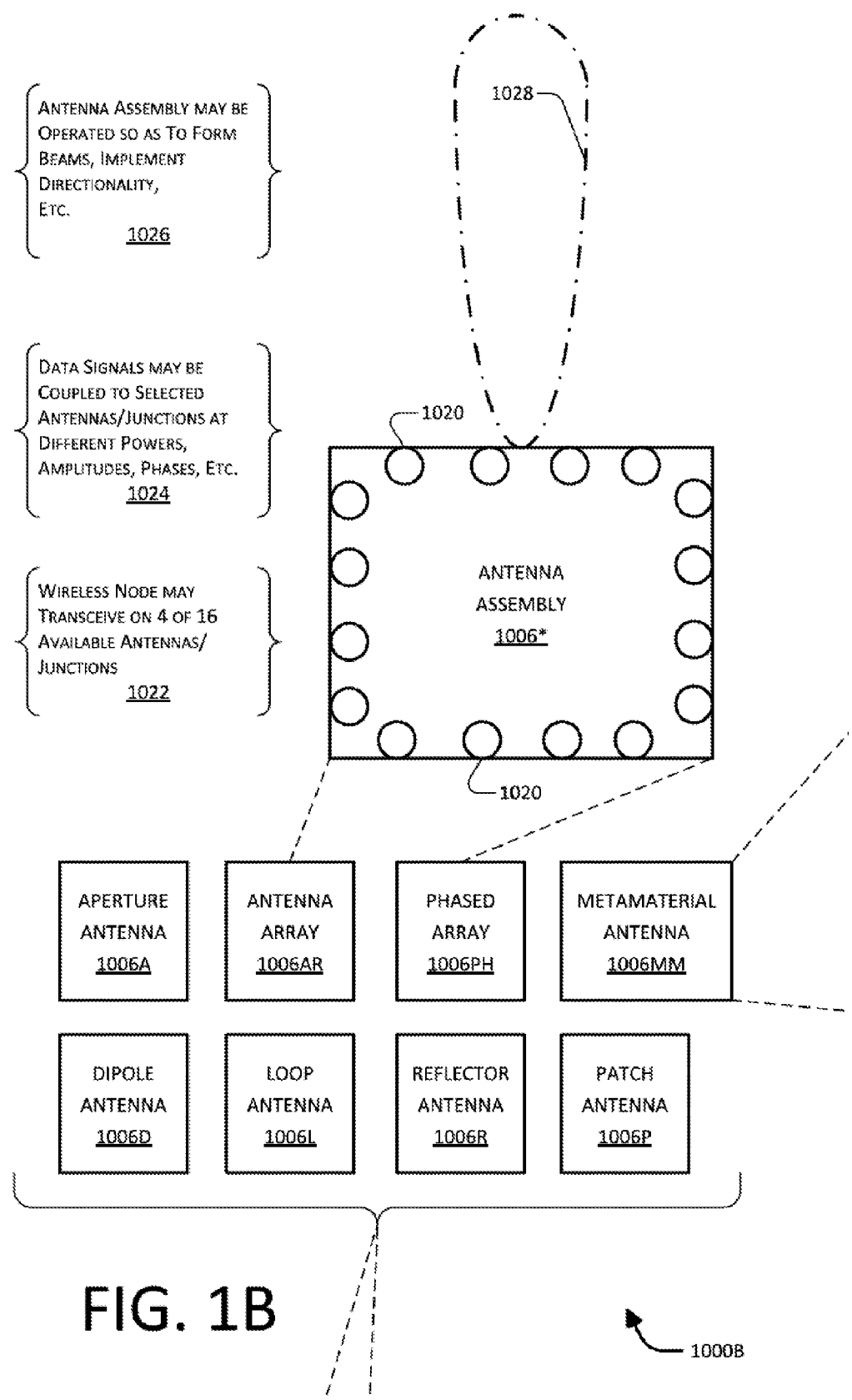
Figure 1C:
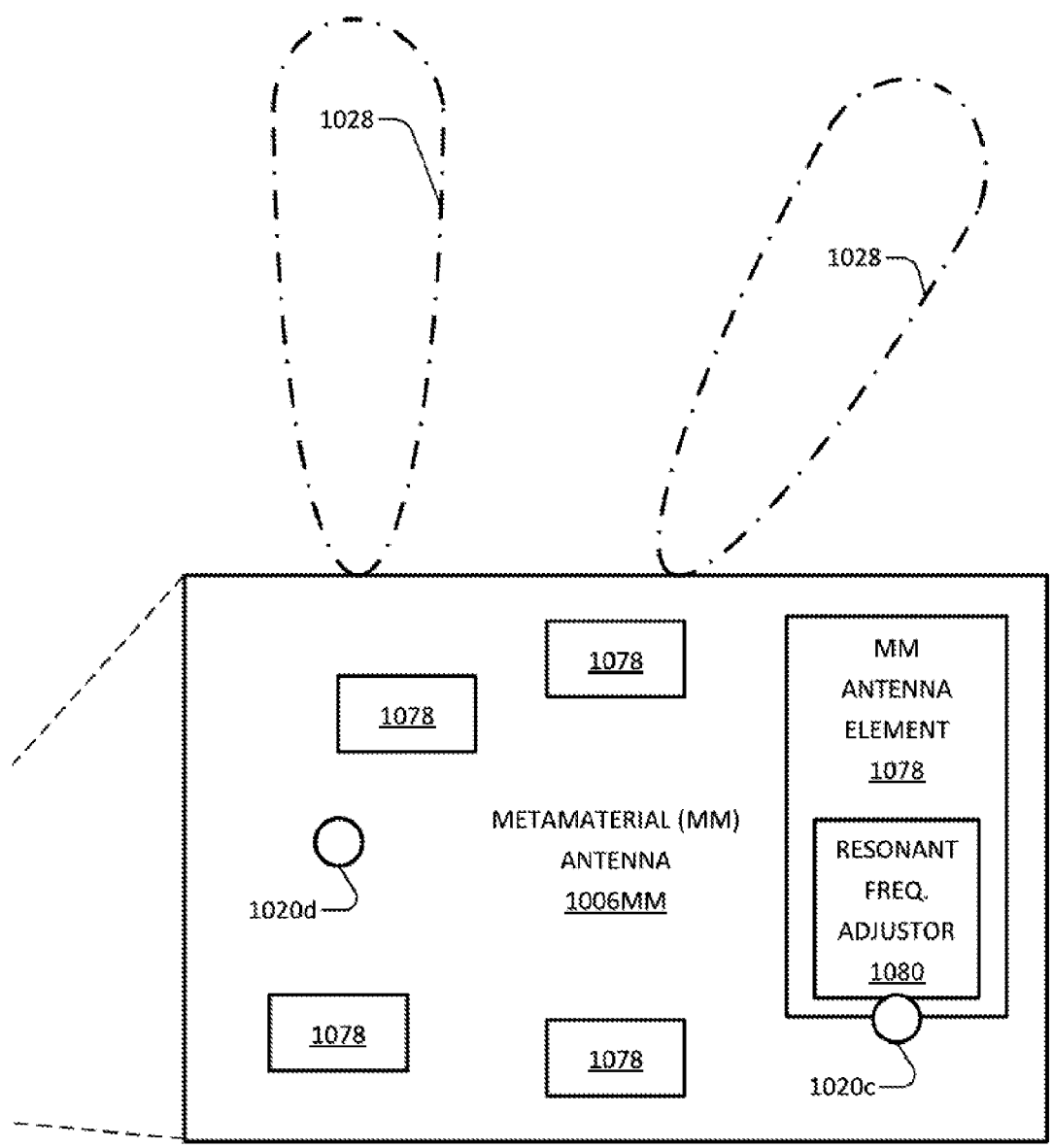
Figure 1D:
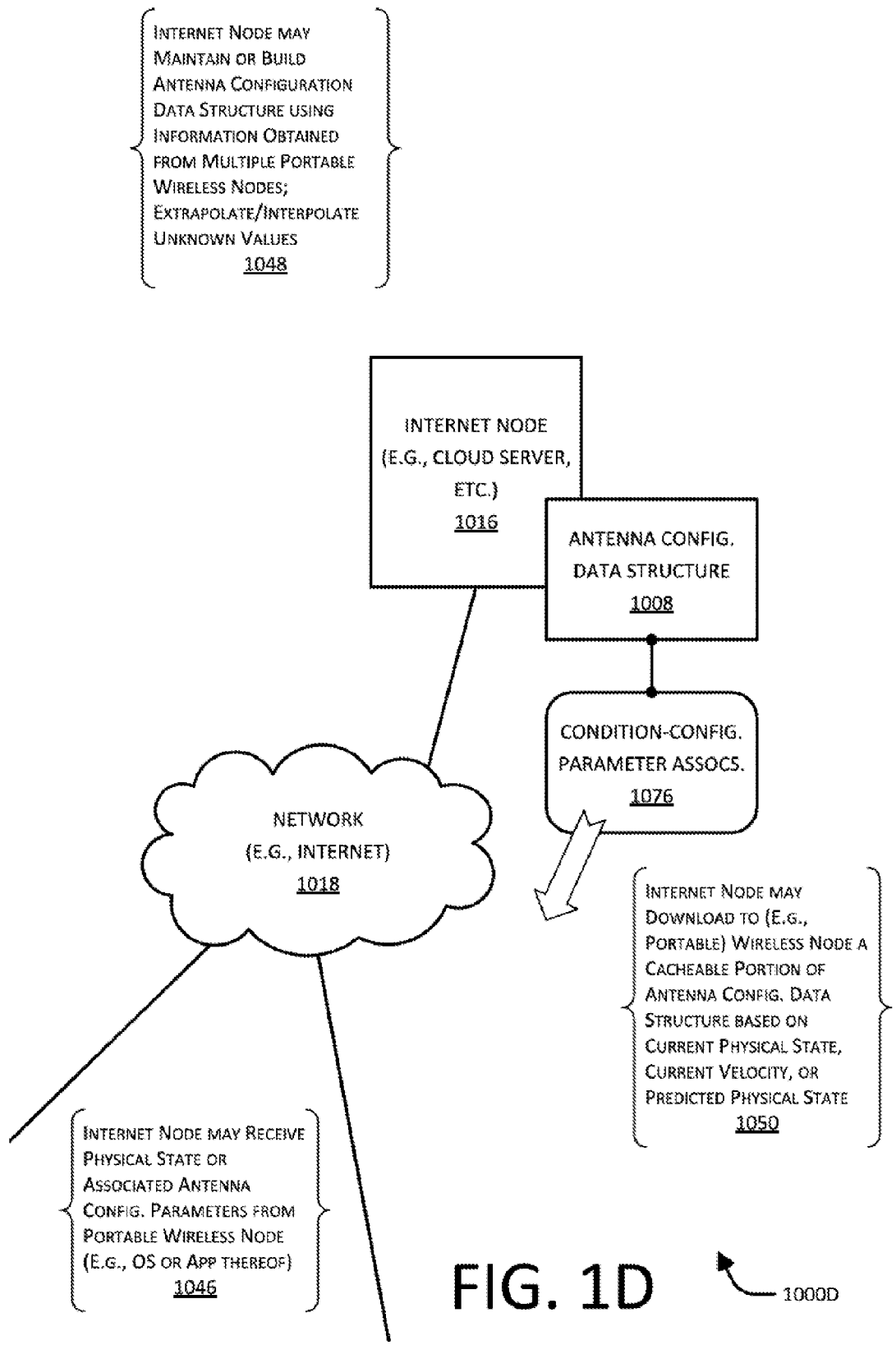
Figure 1E:
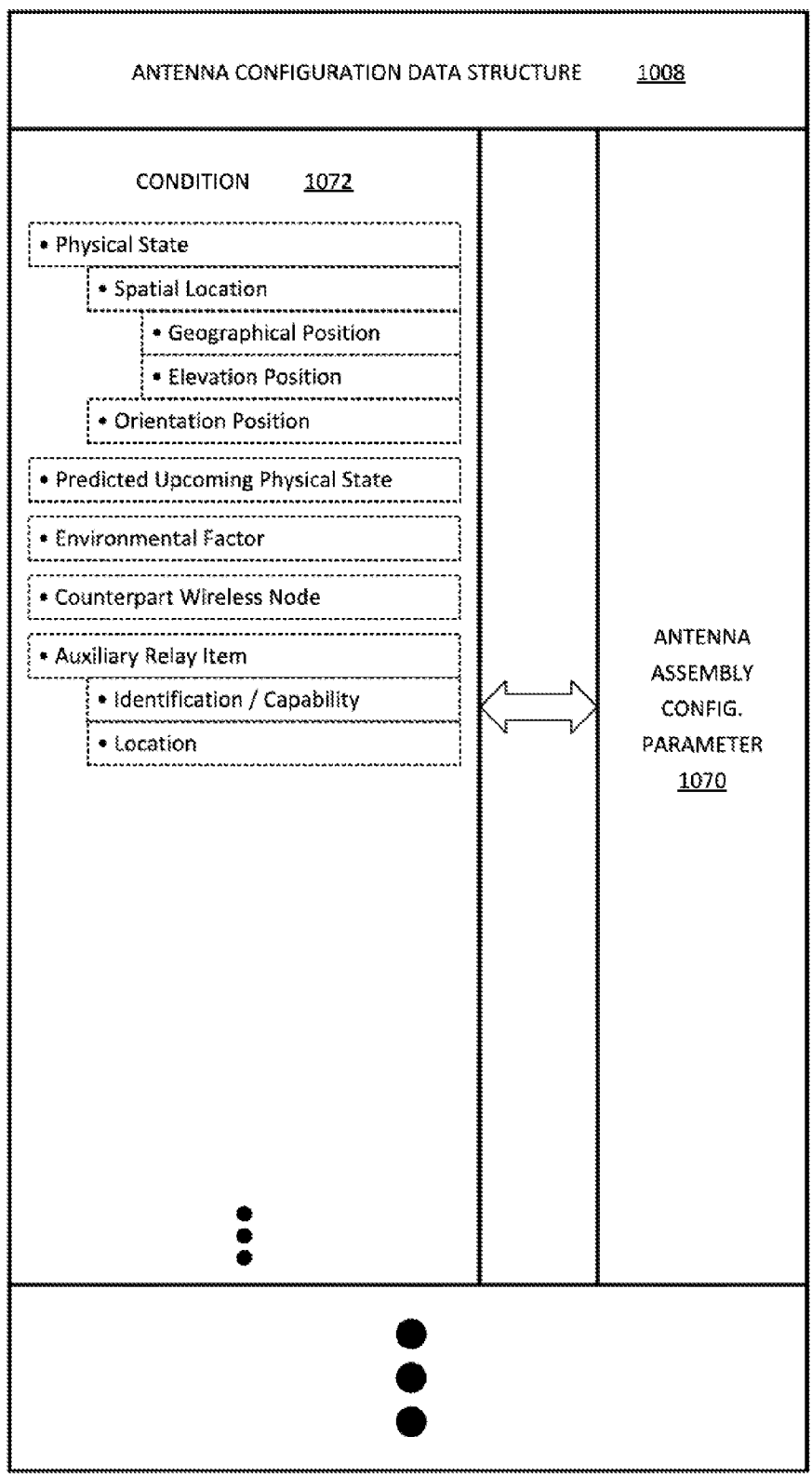
Figure 1F:
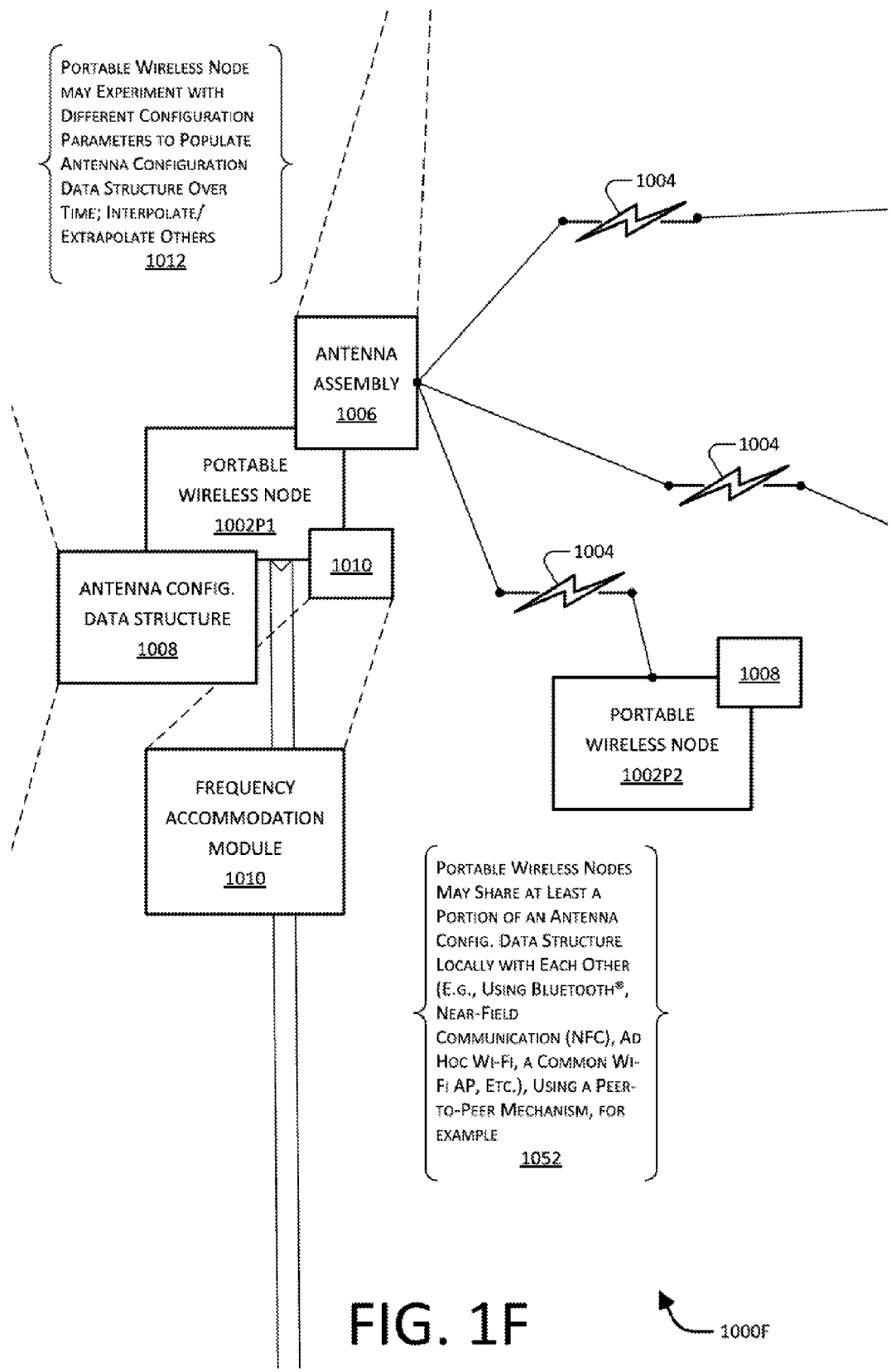
Figure 1G:
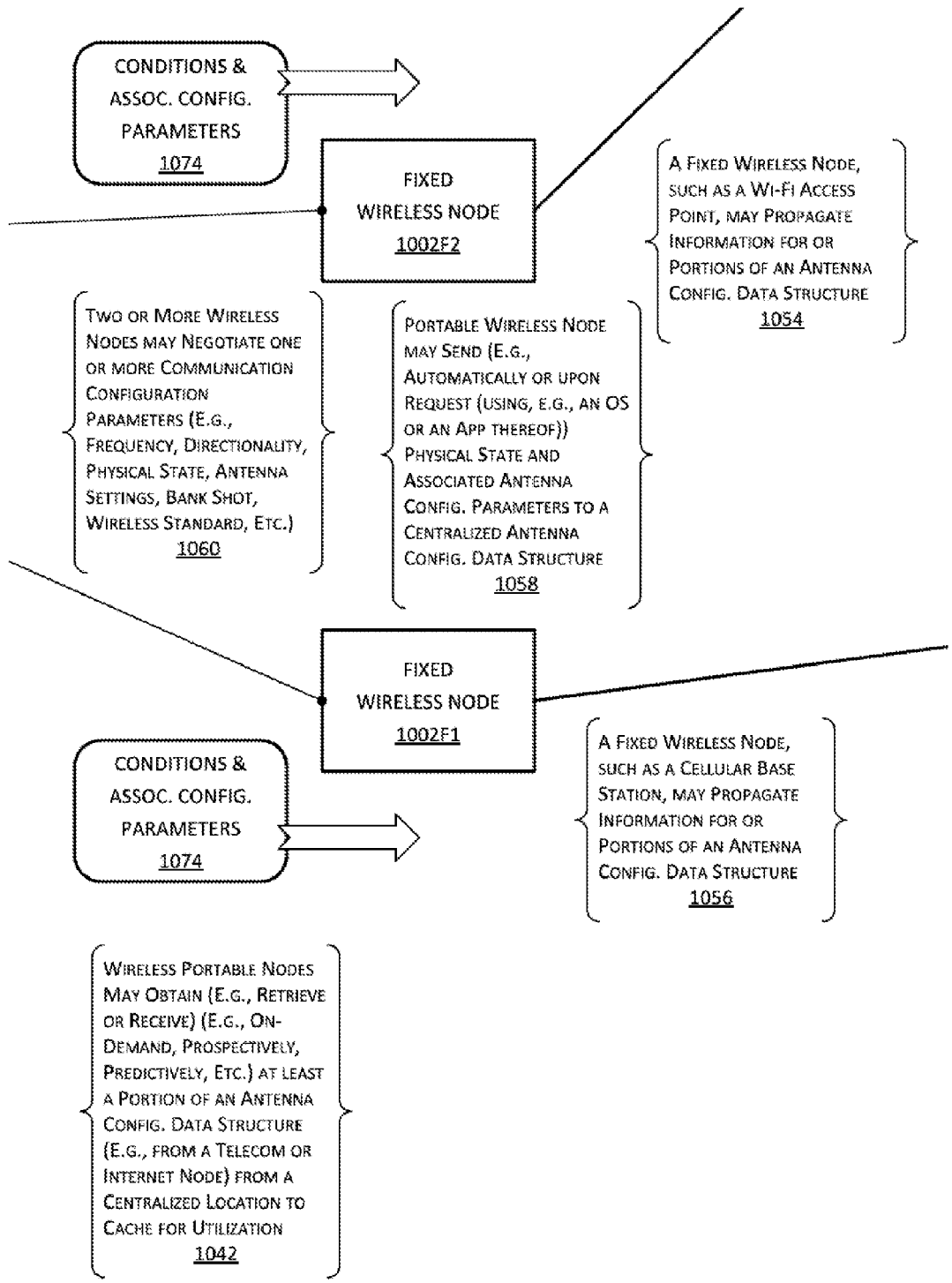
Figure 1H:
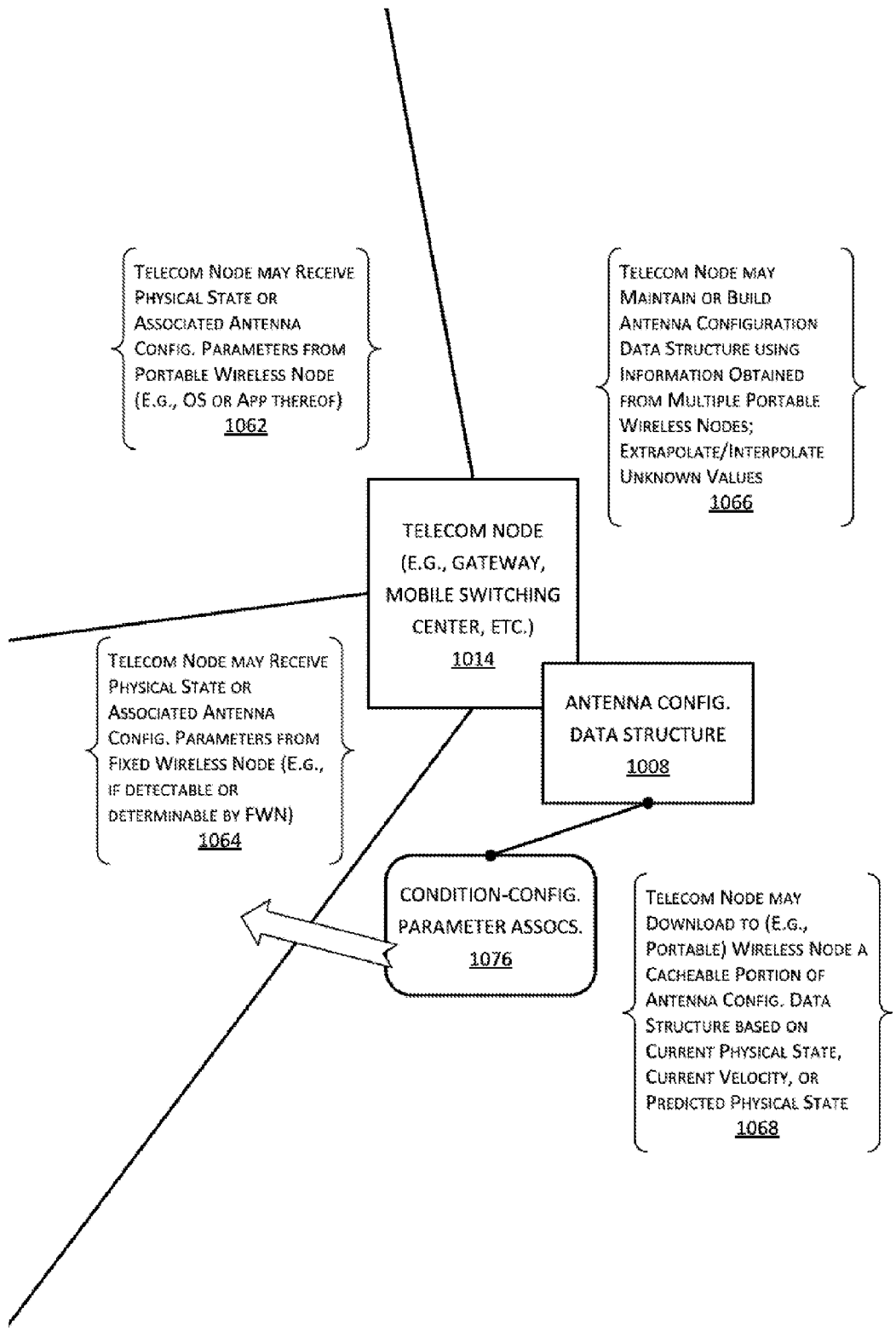
Figure 1I:
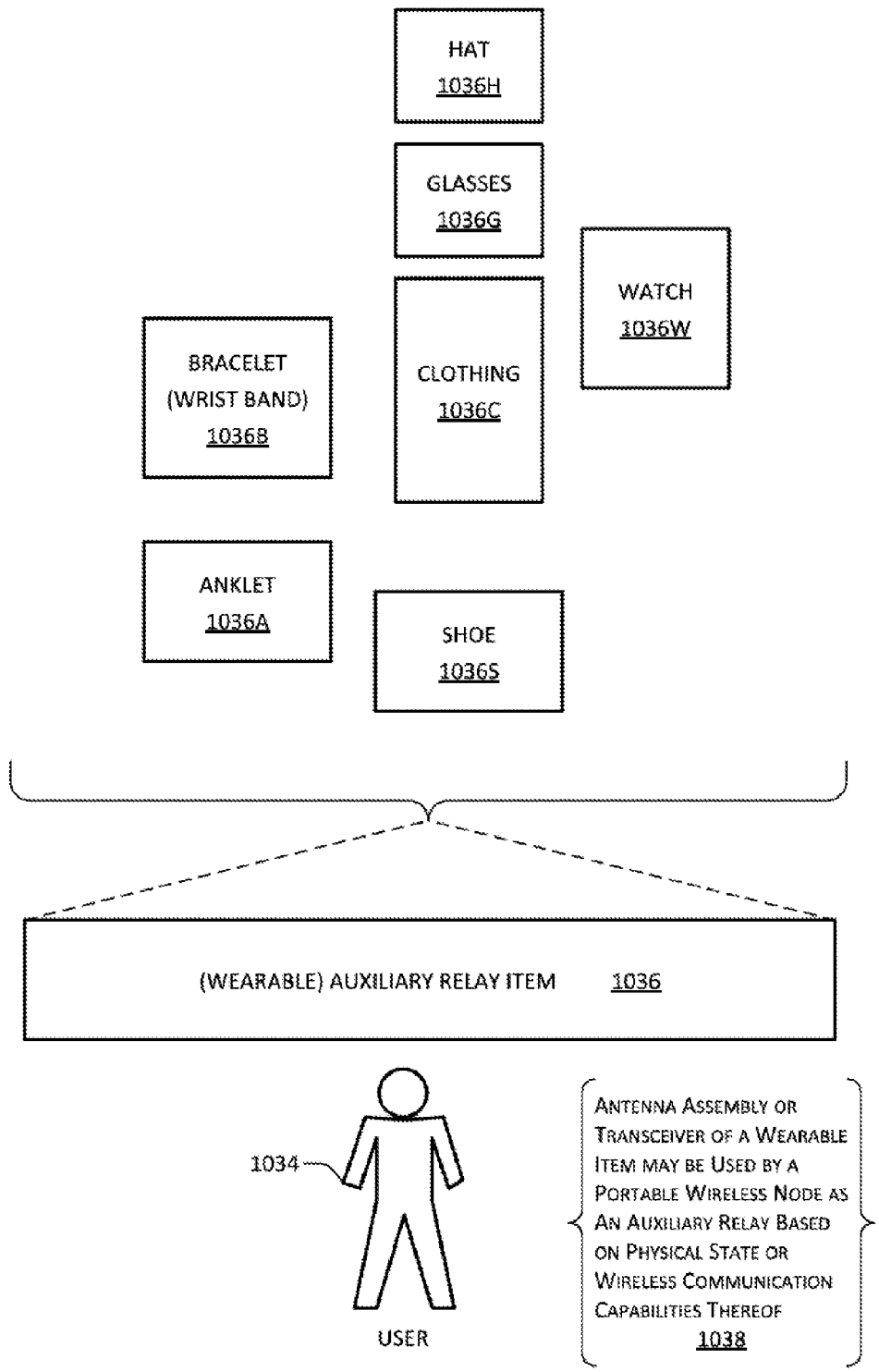
Figure 1J:
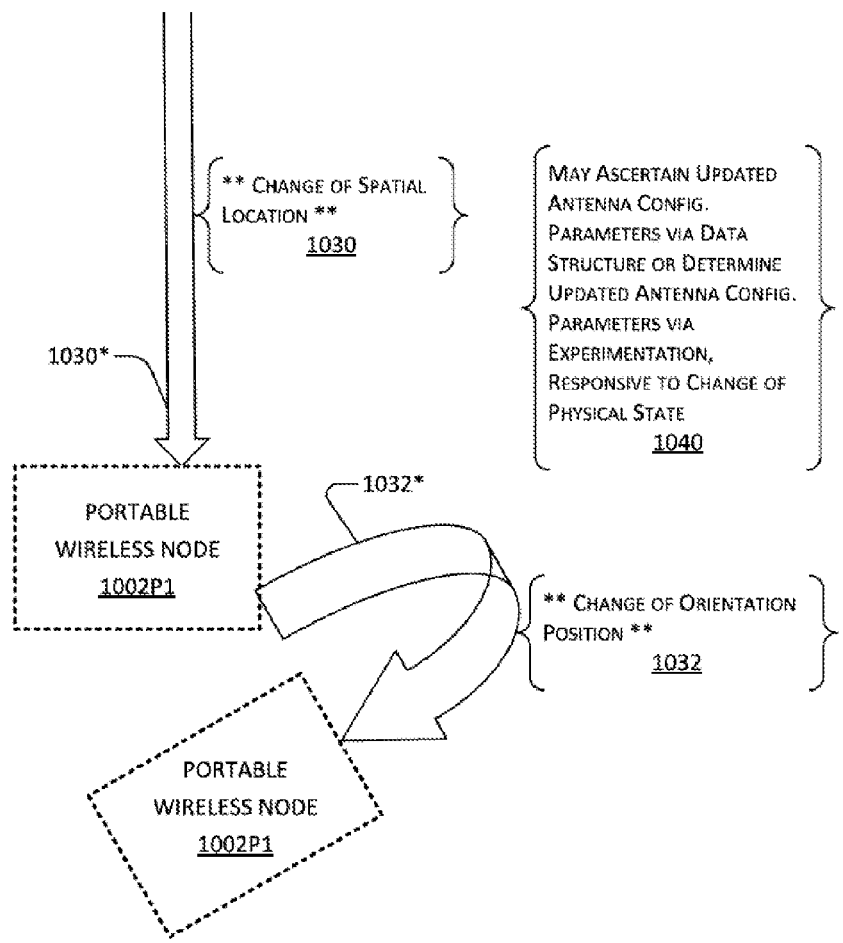
Figure 1K:
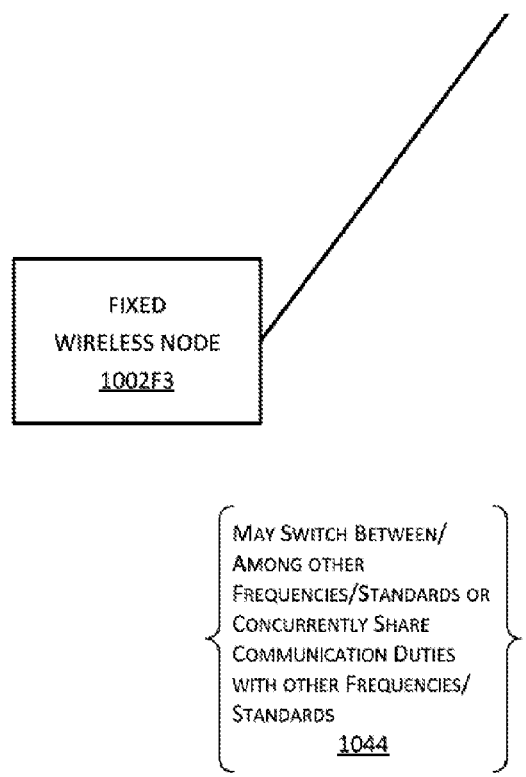

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

For certain example embodiments, one or more wireless communication parameters may be adopted by a mobile device based at least partially on a physical state of a mobile device to strengthen, enhance, improve, or a combination thereof, etc. a communication channel between a mobile device and another wireless device, such as a base station. Additionally or alternatively, a physical state of (e.g., a location of or an orientation of) a mobile device may be altered to strengthen, enhance, improve, or a combination thereof, etc. a communication channel between a mobile device and an another device, such as a base station (e.g., orientation of at least one communicating device may be altered to strengthen, enhance, improve, or a combination thereof, etc. a communication channel between/among one or more wireless devices).

For certain example embodiments, a physical state of a mobile device may include a spatial location of the mobile device or an orientation of the mobile device. For certain example implementations, a spatial location (e.g., which may be merged with or incorporated into or linked to 3-D mapping data, including those of buildings) may be represented with a geographical position of a mobile device (e.g., with regard to a point on the earth) or an elevation of a mobile device (e.g., with regard to a height above the earth). For certain example implementations, an orientation may be represented with (1) Euler angles or rotations or (2) pitch, roll, or yaw in 3-D Euclidean space.

For certain example embodiments, one or more wireless communication parameters, such as one or more antenna assembly configuration parameters, may include, but are not limited to any one or more of the following. First, an antenna element set may be selected from among multiple antenna elements of an antenna array. Second, a particular phase or delay may be applied to each antenna element of a selected set of antenna elements. Third, a particular power may be applied to each antenna element of a selected set of antenna elements. Fourth, a phased array antenna (e.g., which may be formed from multiple antenna elements comprising or including a single dipole) may include multiple antenna elements that are driven with particular signal values. For instance, different elements (e.g., if an element is covered/blocked), phases/delays, power, or a combination thereof, etc. may be applied to input/output connections of a phased array antenna (e.g., to establish or form a beam). Antennas, including but not limited to antenna arrays or phased arrays, may comprise or include or be formed or constructed using meta-materials. Fifth, a frequency of wireless signal(s) coupled to or from an antenna may be adjusted. Sixth, a frequency band or a wireless communication standard that is being employed may be altered, including but not limited to using a different antenna to support a different frequency band or wireless communication standard.

Figure 2:
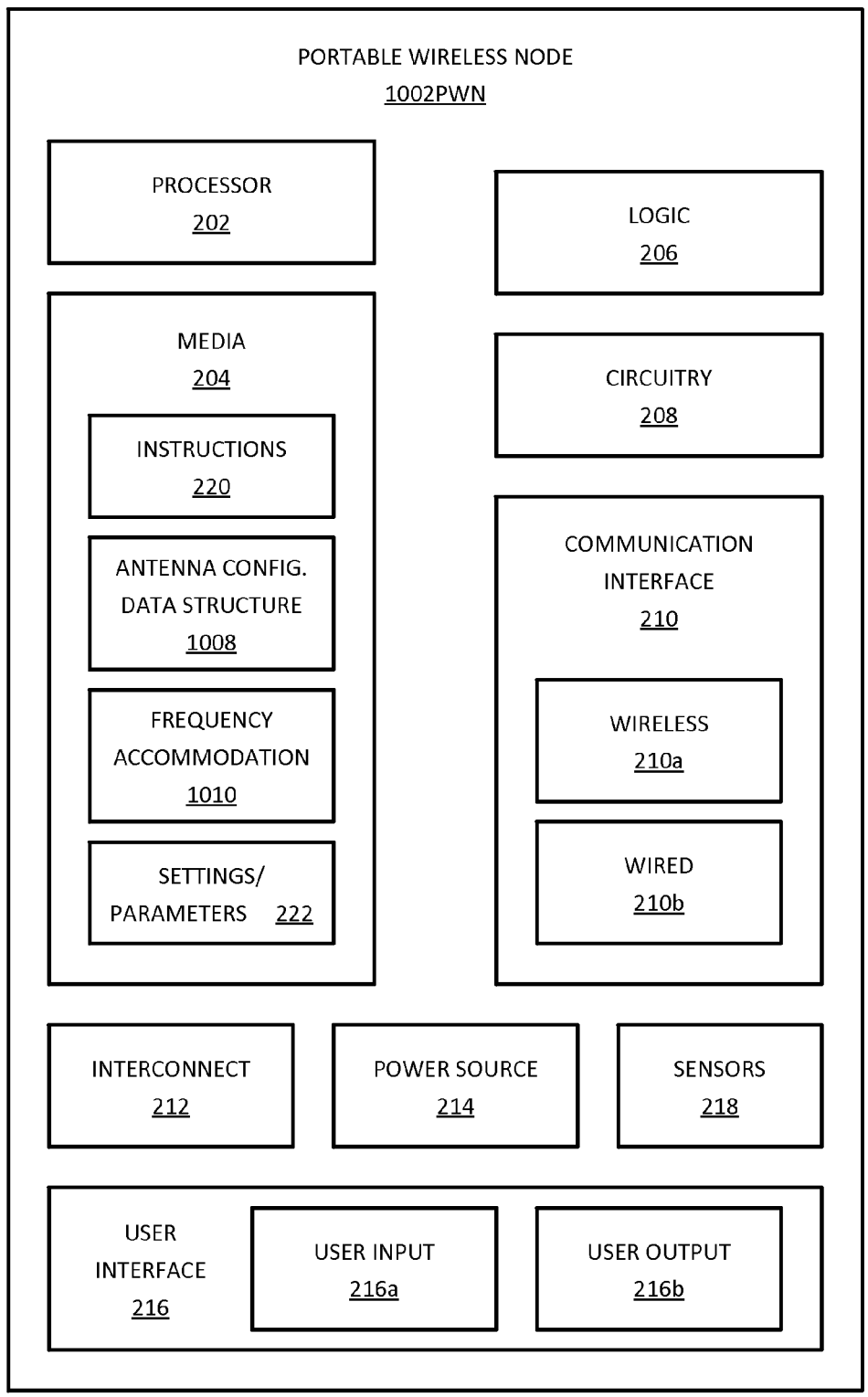
FIG. 2 is a schematic diagram of an example portable wireless node including one or more example components in accordance with certain example embodiments.
Figure 3:
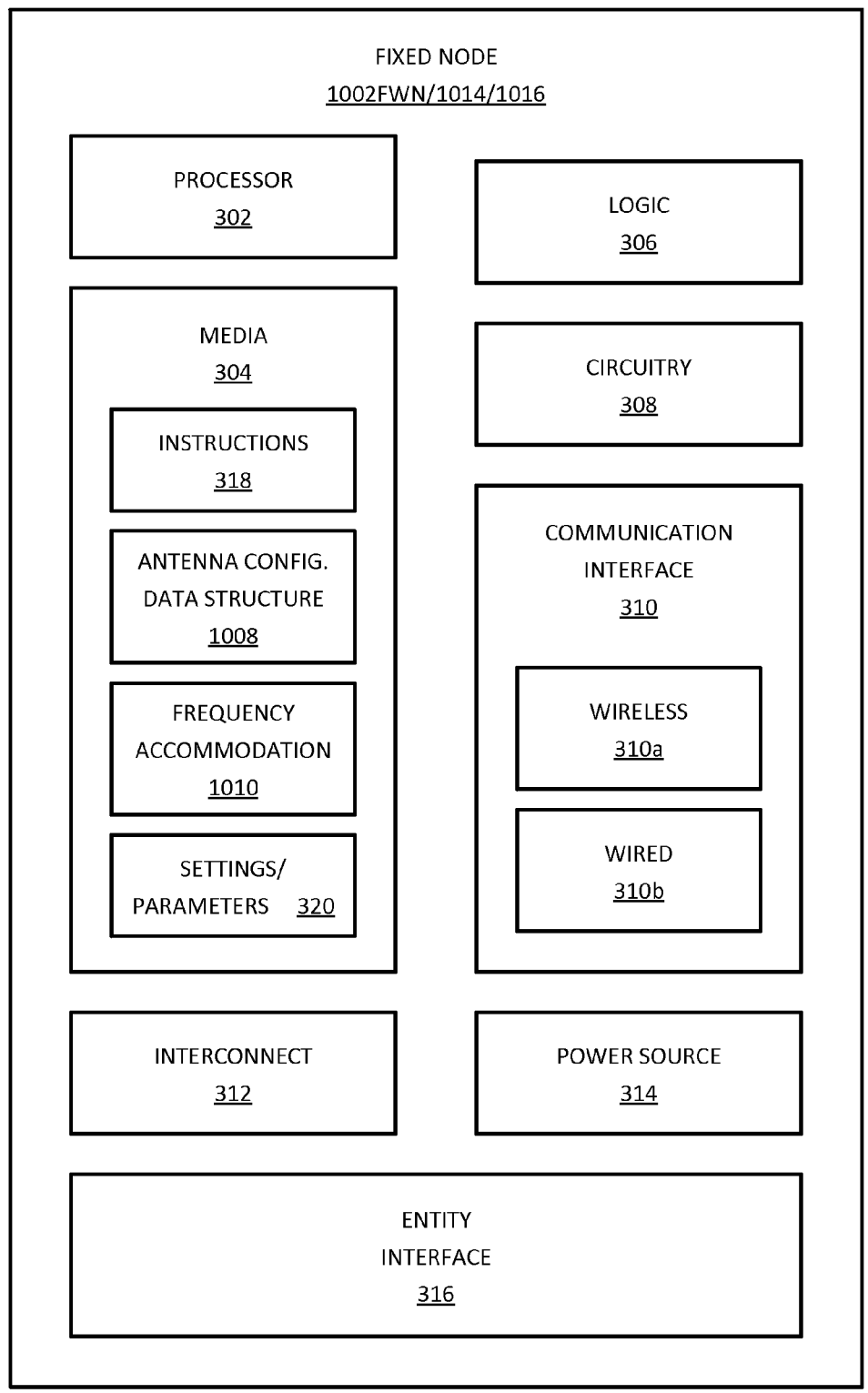
FIG. 3 is a schematic diagram of an example fixed node, such as a fixed wireless node or a fixed wired node, including one or more example components in accordance with certain example embodiments.

APPLICANT HEREBY INCORPORATES BY REFERENCE HEREIN DESCRIPTION OF AND TEXT ASSOCIATED WITH FIGS. 1-3 (E.G., FIGS. 1, 1A, 1B, 1C, 1D, 1E, 1F, 1G, 1H, 1I, 1J, 1K, 1L, 2, AND 3), INCLUDING BUT NOT LIMITED TO PARAGRAPHS [0017]-[0092] INCLUSIVE IN THEIR ENTIRETY, AT LEAST TO THE EXTENT SUCH SUBJECT MATTER IS NOT INCONSISTENT HEREWITH, OF U.S. patent application Ser. No. 13/842,040, entitled "Frequency Accommodation", naming Roderick A. Hyde et al. as inventors, filed 15 Mar. 2013.

Figure 4A:
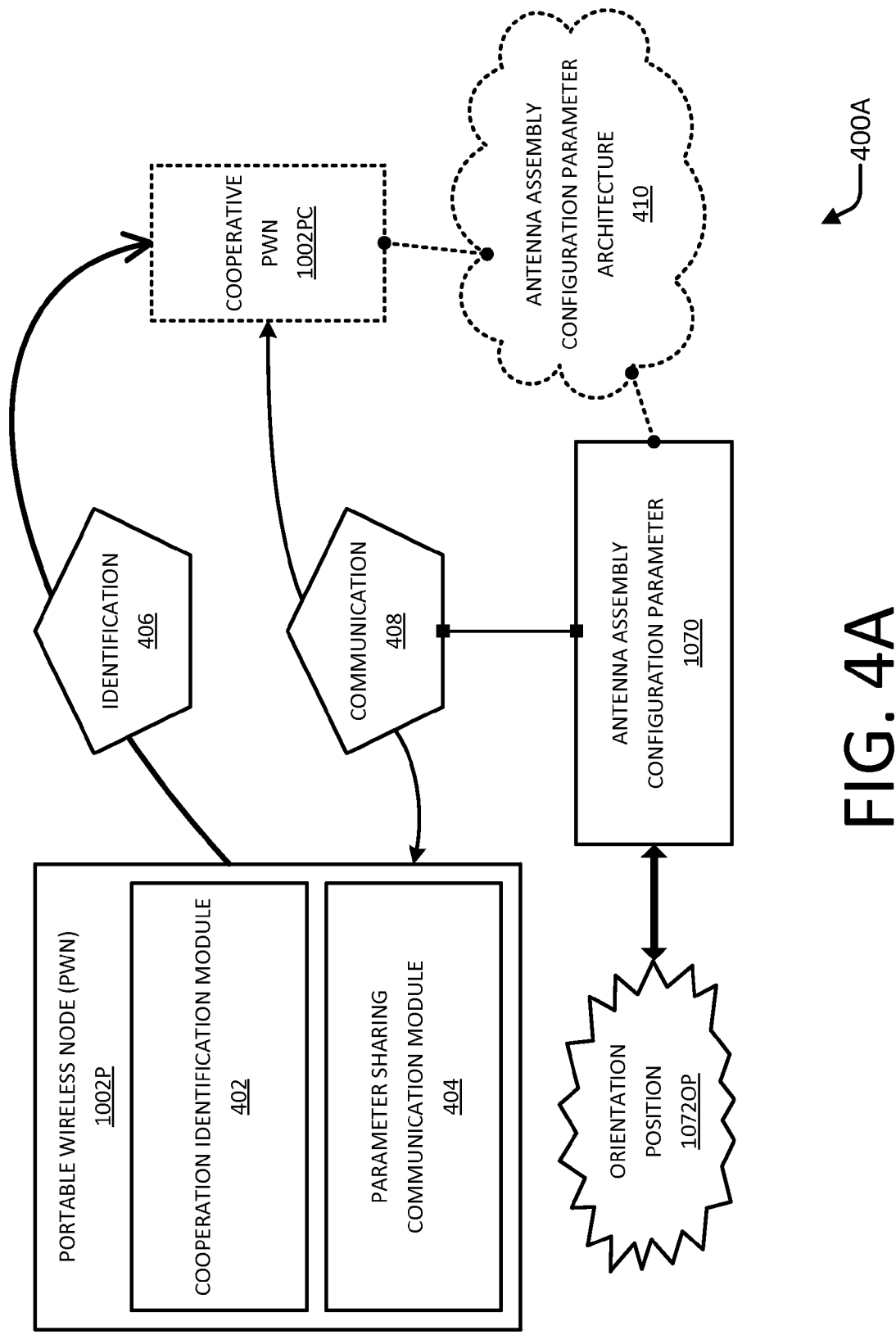
FIG. 4A is a schematic diagram that includes at least one example device, such as a portable wireless node, that is capable of handling scenarios for portable wireless node local cooperation in accordance with certain example embodiments.

FIG. 4A is a schematic diagram 400A that includes at least one example device, such as a portable wireless node, that is capable of handling scenarios for portable wireless node local cooperation in accordance with certain example embodiments. As shown in FIG. 4A, by way of example but not limitation, schematic diagram 400A depicts at least one device that may include or comprise at least one portable wireless node (PWN) 1002P. More specifically, schematic diagram 400A depicts at least one device that may include at least one cooperation identification module 402 or at least one parameter sharing communication module 404. Additionally or alternatively, schematic diagram 400A may include, by way of example but not limitation, at least one identification 406, at least one communication 408, at least one cooperative portable wireless node (PWN) 1002PC, at least one antenna assembly configuration parameter architecture 410, at least one antenna assembly configuration parameter 1070, or at least one orientation position 10720P. By way of example but not limitation, a cooperation identification module 402 or a parameter sharing communication module 404 may include or comprise or be realized with at least one processor that executes instructions (e.g., sequentially, in parallel, at least partially overlapping in a time-multiplexed fashion, at least partially across multiple cores, or a combination thereof, etc.) as at least one special-purpose computing component, or otherwise as described herein. However, claimed subject matter is not limited to any particular described embodiments, implementations, examples, etc.

For certain example embodiments, a cooperation identification module 402 or a parameter sharing communication module 404 may be implemented separately or at least partially jointly or in combination with or by at least one portable wireless node 1002P. For certain example implementations, a cooperation identification module 402 may be configured to identify (e.g., via at least one identification 406) at least one cooperative portable wireless node (PWN) 1002PC to participate in an antenna assembly configuration parameter architecture 410. For certain example implementations, a parameter sharing communication module 404 may be configured to communicate (e.g., via at least one communication 408) with at least one cooperative portable wireless node 1002PC to share one or more antenna assembly configuration parameters 1070 that are associated with at least one orientation position 10720P of at least one portable wireless node (e.g., which may be a same or a different portable wireless node 1002P as performs identification 406 or communication 408, which may be a same or a different portable wireless node 1002PC that is identified as cooperative, which may be a general portable wireless node, or a combination thereof, etc.).

Figure 4B:
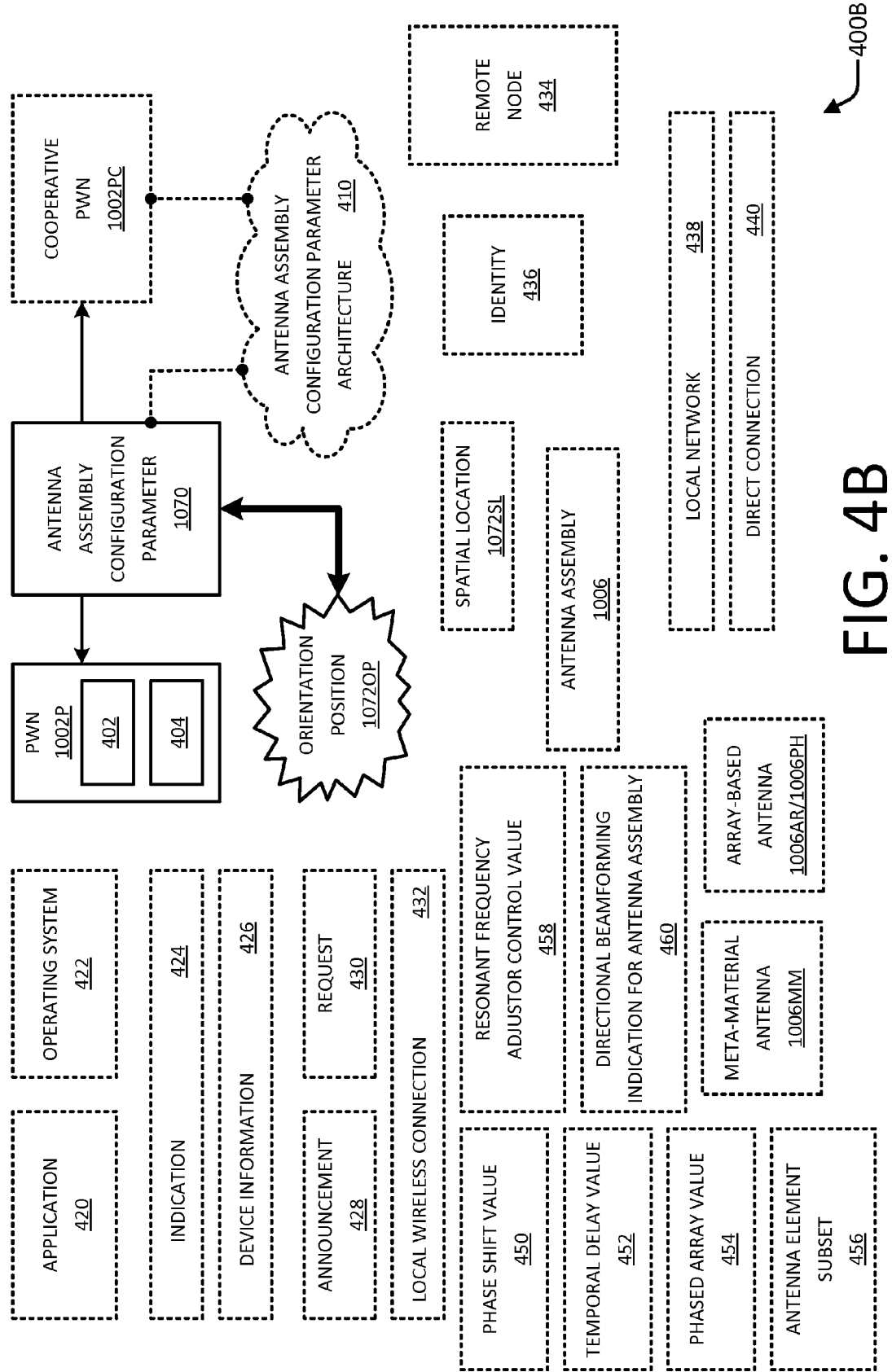
FIGS. 4B-4D are schematic diagrams that include at least one example device and that depict example scenarios for portable wireless node local cooperation in accordance with certain example embodiments.
Figure 4C:
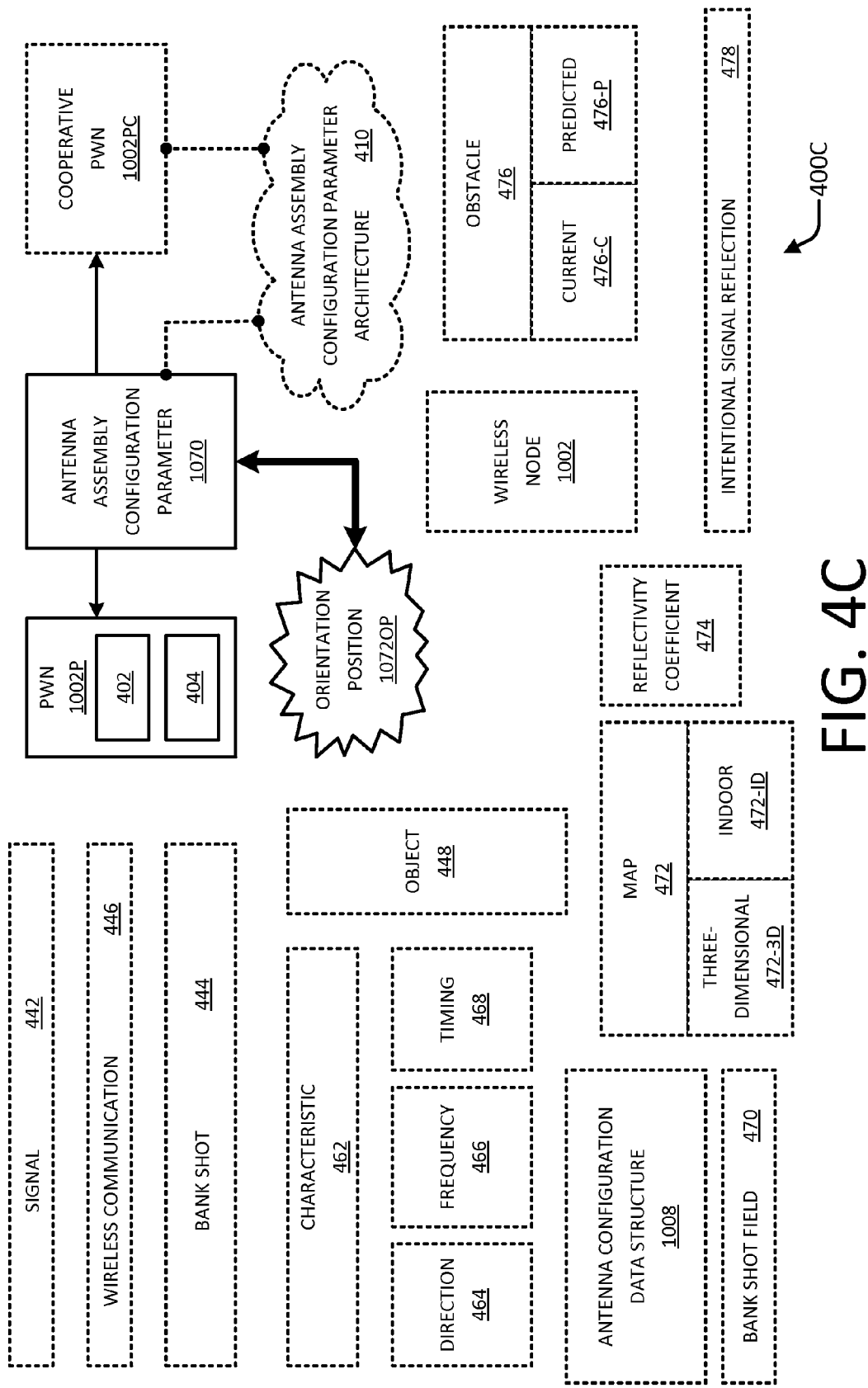
Figure 4D:
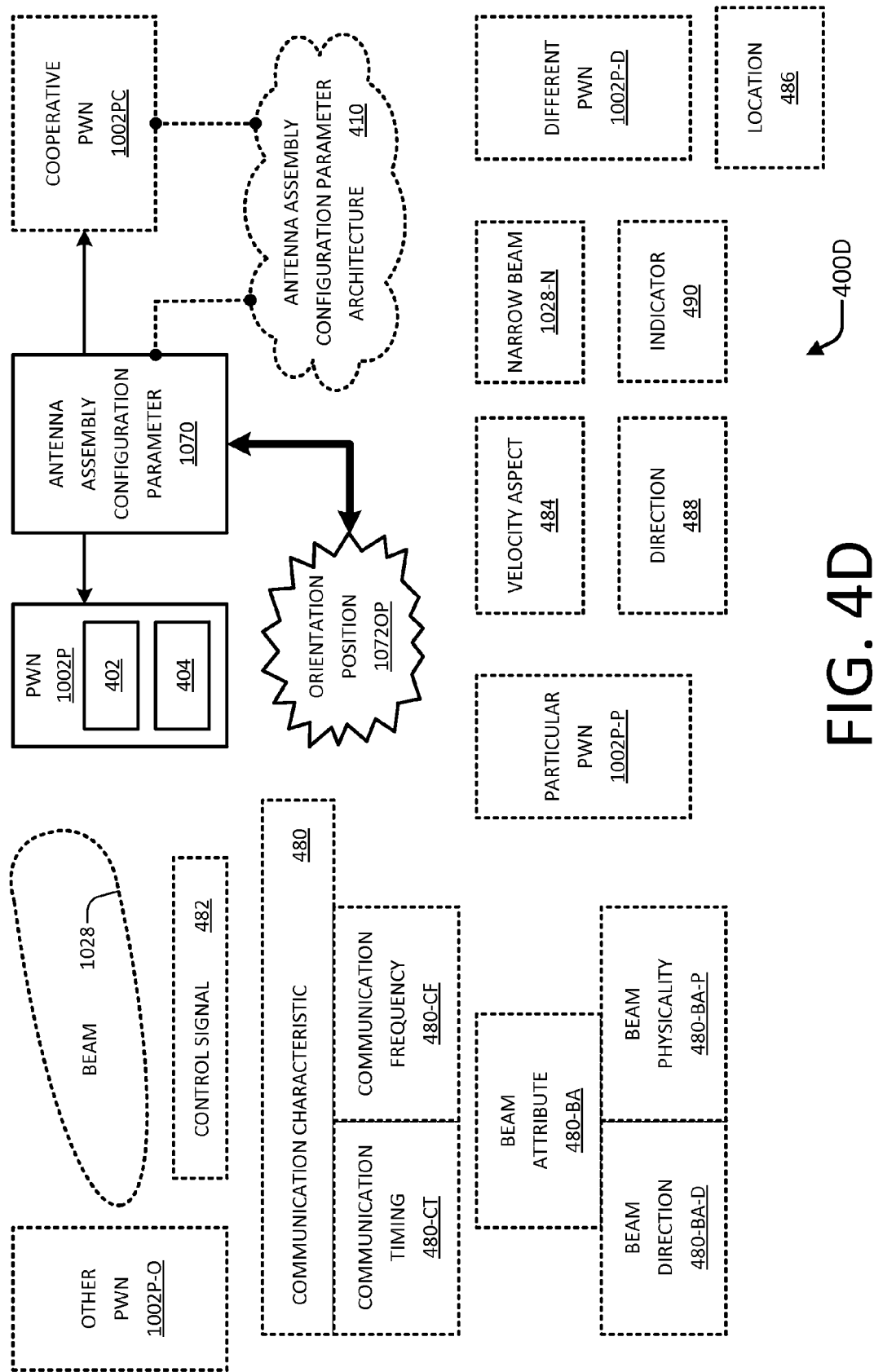

FIGS. 4B-4D are schematic diagrams 400B-400D that include at least one example device and that depict example scenarios for portable wireless node local cooperation in accordance with certain example embodiments. As shown in FIGS. 4B-4D, by way of example but not limitation, one or more of schematic diagrams 400B-400D may include at least one portable wireless node (PWN) 1002P, at least one cooperation identification module 402, at least one parameter sharing communication module 404, at least one antenna assembly configuration parameter architecture 410, at least one cooperative portable wireless node (PWN) 1002PC, at least one antenna assembly configuration parameter 1070, or at least one orientation position 10720P. Each of schematic diagrams 400B-400D may include alternative or additional depictions, which may relate to portable wireless node local cooperation, as described herein. In addition to or in alternative to description herein below with specific reference to FIGS. 4B-4D, illustrated aspects of schematic diagrams 400B-400D may be relevant to example description with reference to any one or more of FIG. 5 or 6A-6G. However, claimed subject matter is not limited to any particular described embodiments, implementations, examples, etc.

As shown in FIG. 4B, by way of example but not limitation, schematic diagram 400B may further include at least one application 420, at least one operating system 422, at least one indication 424, at least some device information 426, at least one announcement 428, at least one request 430, at least one local wireless connection 432, at least one spatial location 1072SL, at least one remote node 434, at least one identity 436, at least one local network 438, at least one direct connection 440, at least one phase shift value 450, at least one temporal delay value 452, at least one phased array value 454, at least one antenna element subset 456, at least one resonant frequency adjustor control value 458, at least one directional beamforming indication for an antenna assembly 460, at least one antenna assembly 1006, at least one meta-material antenna 1006MM, or at least one array-based antenna 1006AR/1006PH. Additional or alternative description that may be relevant to schematic diagram 400B is provided herein below with particular reference to one or more of any of FIGS. 6A-6G.

As shown in FIG. 4C, by way of example but not limitation, schematic diagram 400C may further include at least one signal 442, at least one bank shot 444, at least one wireless node 1002, at least one wireless communication 446, at least one object 448, at least one characteristic 462, at least one direction 464, at least one frequency 466, at least one timing 468, at least one antenna configuration data structure 1008, at least one bank shot field 470, at least one map 472, at least one three-dimensional map 472-3D, at least one indoor map 472-ID, at least one reflectivity coefficient 474, at least one obstacle 476, at least one current obstacle 476-C, at least one predicted obstacle 476-P, or at least one intentional signal reflection 478. Additional or alternative description that may be relevant to schematic diagram 400C is provided herein below with particular reference to one or more of any of FIGS. 6A-6G.

As shown in FIG. 4D, by way of example but not limitation, schematic diagram 400D may further include at least one communication characteristic 480, at least one other portable wireless node (PWN) 1002P-O, at least one control signal 482, at least one communication timing 480-CT, at least one communication frequency 480-CF, at least one beam attribute 480-BA, at least one beam direction 480-BA-D, at least one beam physicality 480-BA-P, at least one velocity aspect 484, at least one narrow beam 1028-N, at least one particular portable wireless node (PWN) 1002P-P, at least one different portable wireless node (PWN) 1002P-D, at least one location 486, at least one beam 1028, at least one direction 488, or at least one indicator 490. Additional or alternative description that may be relevant to schematic diagram 400D is provided herein below with particular reference to one or more of any of FIGS. 6A-6G.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
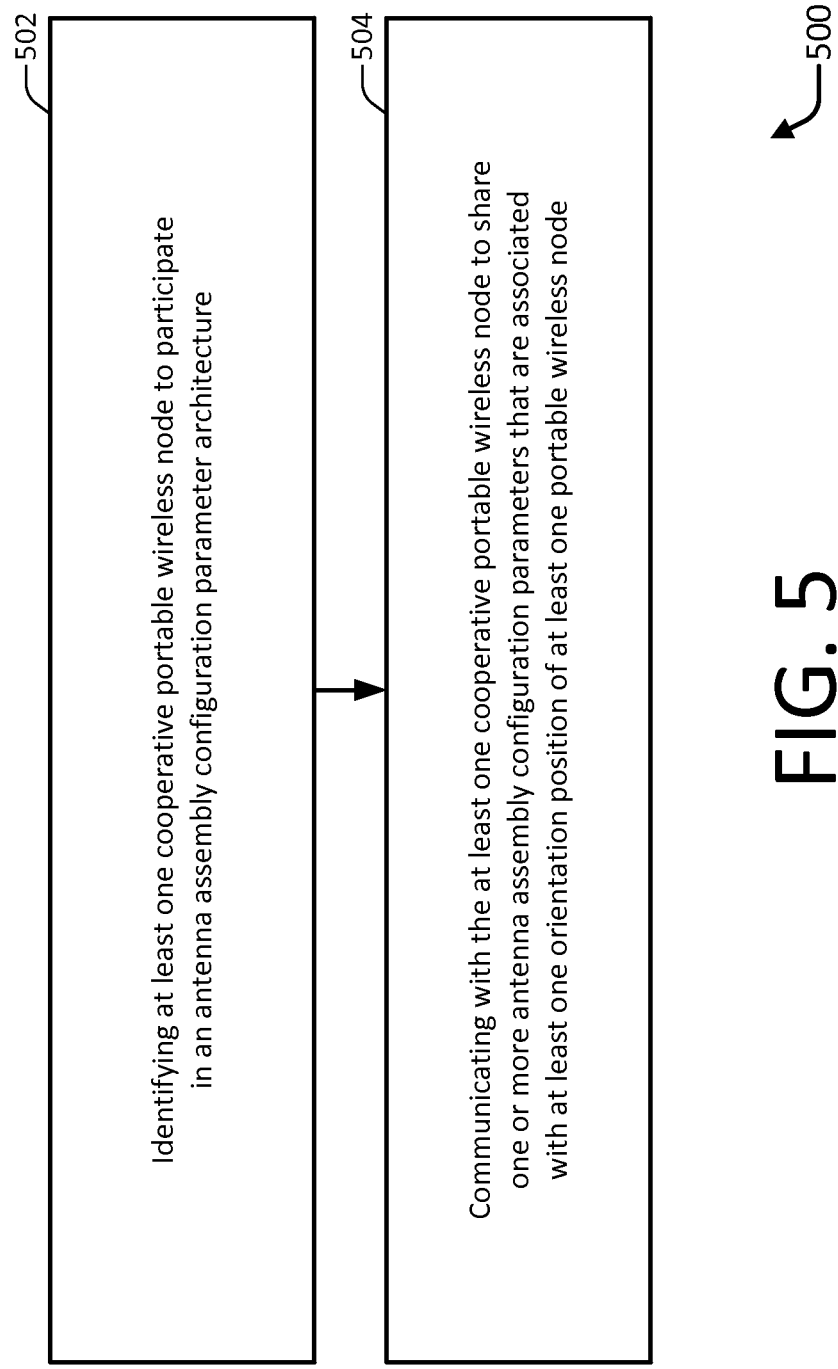
FIG. 5 is a flow diagram illustrating an example method for at least one device with regard to portable wireless node local cooperation in accordance with certain example embodiments.

FIG. 5 is a flow diagram 500 illustrating an example method for at least one device with regard to portable wireless node local cooperation in accordance with certain example embodiments. As illustrated, flow diagram 500 may include any of operations 502-504. Although operations 502-504 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 500 may be performed so as to be fully or partially overlapping with other operation(s). For certain example embodiments, one or more operations of flow diagram 500 may be performed by at least one device, such as a portable wireless node 1002P or at least a portion thereof, such as one or more modules thereof. However, claimed subject matter is not limited to any particular described embodiments, implementations, examples, etc.

For certain example embodiments, a method for portable wireless node local cooperation (e.g., that may include, involve, address, react to, pertain to, or a combination thereof, etc. or other otherwise relate to frequency accommodation), which method may be at least partially implemented using hardware (e.g., circuitry, at least one processor, processor-accessible memory, at least one module, or a combination thereof, etc.) of a device such as a portable wireless node, may include an operation 502 or an operation 504. An operation 502 may be directed at least partially to identifying at least one cooperative portable wireless node to participate in an antenna assembly configuration parameter architecture. For certain example implementations, at least one device (e.g., a portable wireless node 1002P, such as a smart phone device) may identify (e.g., recognize, establish as, detect, ascertain, classify, label, or a combination thereof, etc.) at least one cooperative (e.g., willing to work together, indicative of a desire to engage in joint efforts, intending to support common purpose or benefit, collaborative, symbiotic, coordinating, or a combination thereof, etc.) portable wireless node 1002PC (e.g., a mobile device, a mobile phone, a tablet, a slate computer, a phablet, a portable gaming device, a smartphone, a notebook computer, a mobile repeater, a user equipment (UE), a mobile station (MS), a laptop computer, a hand-held radio, a wireless component for a vehicle, a walker-talkie, a roving transceiver, a wireless device that moves under its own power or control (e.g., an autonomous motorized robot or an unmanned aerial vehicle (UAV)), a wireless device that moves under the power or control of another entity (e.g., a vehicle or a remotely-piloted craft that is controlled by either a passenger or a remote human or by a remote machine), or a combination thereof, etc.) to participate in (e.g., partake in, contribute to, have a part of along with one or more others, engage in, join in, take an act or perform an operation with respect to, help effectuate, or a combination thereof, etc.) an antenna assembly configuration parameter architecture 410 (e.g., foundation, schema, structure, frame, shell, or a combination thereof, etc. that pertains to a localized, ad hoc, database-including (e.g., a storage solution that provides responses to queries, such as an structured query language (SQL) database), portable-device-employing, or a combination thereof, etc. implementation or usage of antenna assembly configuration parameters that promotes their manipulation, dissemination, organization, storage, application, handling, administration, or a combination thereof, etc. between or among two or more wireless nodes). By way of example but not limitation, at least one portable wireless node may identify at least one cooperative portable wireless node to participate in an antenna assembly configuration parameter architecture (e.g., a mobile wireless node, such as an Android-based smart phone, may detect or recognize another mobile wireless node, such as an Android-based tablet, that is willing to work together with the mobile wireless node to realize a scheme that enables a dissemination via transmitting or receiving of one or more antenna assembly configuration parameters, such as selected antenna junctions or one or more meta-material antenna settings).

For certain example embodiments, an operation 504 may be directed at least partially to communicating with the at least one cooperative portable wireless node to share one or more antenna assembly configuration parameters that are associated with at least one orientation position of at least one portable wireless node. For certain example implementations, at least one device (e.g., a portable wireless node 1002P, such as a tablet computer) may communicate (e.g., impart, transmit, receive, exchange, broadcast, accept delivery, send, or a combination, thereof, etc. via at least one communication 408 information, data, knowledge, bits, or a combination thereof, etc.) with at least one cooperative (e.g., willing to work together, indicative of a desire to engage in joint efforts, intending to support common purpose or benefit, collaborative, symbiotic, coordinating, or a combination thereof, etc.) portable wireless node 1002PC to share (e.g., give, take, participate in using or distributing, utilize jointly, mete out, forward, provide, procure, unilaterally transmit or receive, bi-directionally exchange, provide, offer, or a combination thereof, etc.) one or more antenna assembly configuration parameters 1070 (e.g., at least one variable impacting functionality of an antenna assembly or electromagnetic radiation emanating therefrom or collecting thereby, at least one mechanism affecting antenna assembly performance, at least one value applied to an antenna assembly control or data input, at least one boundary or guideline for how electromagnetic fields are to interact with an adjustable antenna assembly, at least one description of how to manipulate signals being forwarded to or accepted from an antenna assembly, at least one indication of a direction to point an antenna beam, at least one indication of a pattern in which to form an antenna beam, one or more phase delays, meta-material antenna control signal values, phased-array antenna operational inputs, antenna element or junction selection indicators, or a combination thereof, etc.) that are associated with (e.g., that correspond to, that are linked to, that relate to, that pertain to, that are matched with, that are mated to, that are derived from, or a combination thereof, etc.) at least one orientation position 10720P (e.g., a direction that is being faced toward or pointed to, a vector in space—such as a normal to a face or an edge of a device, an Euler value, a roll or pitch or yaw value, a value representing a tilt, a rotational position, an angle of inclination or declination, an equation defining a geometric object—such as a plane—having a determinable relationship to a position of a mobile device—such as lying within or being parallel thereto, or a combination thereof, etc.) of at least one portable wireless node (e.g., which may be a same or a different portable wireless node 1002P as performs operation 502 or operation 504, which may be a same or a different portable wireless node 1002PC that is identified as cooperative, which may be a general portable wireless node, or a combination thereof, etc.) (e.g., a mobile device, a mobile phone, a tablet, a slate computer, a phablet, a portable gaming device, a smartphone, a notebook computer, a mobile repeater, a UE, a MS, a laptop computer, a hand-held radio, a wireless component for a vehicle, a walker-talkie, a roving transceiver, a wireless device that moves under its own power or control (e.g., an autonomous motorized robot or an unmanned aerial vehicle (UAV)), a wireless device that moves under the power or control of another entity (e.g., a vehicle or a remotely-piloted craft that is controlled by either a passenger or a remote human or by a remote machine), or a combination thereof, etc.). By way of example but not limitation, at least one portable wireless node may communicate with the at least one cooperative portable wireless node to share one or more antenna assembly configuration parameters that are associated with at least one orientation position of at least one portable wireless node (e.g., a mobile wireless node, such as a Samsung Galaxy Tab tablet computer, (i) may engage in a transmission with another mobile wireless node, such as an Apple iPhone, to provide or (ii) may engage in a reception with another mobile wireless node to procure a description of at least one direction of electromagnetic interaction—such as transmissive or receptive interaction—that is associated with an angle at which the tablet is propped up on a table at a known geospatial location).

FIGS. 6A-6G depict example additions or alternatives for a flow diagram of FIG. 5 in accordance with certain example embodiments. As illustrated, flow diagrams of FIGS. 6A-6G may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently or along with one or more other operations). Also, at least some operation(s) of flow diagrams of FIGS. 6A-6G may be performed so as to be fully or partially overlapping with other operation(s). Moreover, one or more of flow diagrams of FIGS. 6A-6G may illustrate implementation of one or more additional operations as represented by an operation 506 (e.g., if depicted). One or more additional operations of an operation 506 may alternatively be performed independently. For certain example embodiments, one or more operations of flow diagrams 600A-600G (of FIGS. 6A-6G) may be performed by at least one device (e.g., a portable wireless node 1002P or at least a portion thereof, such as one or more modules thereof). However, claimed subject matter is not limited to any particular described embodiments, implementations, examples, etc.

FIG. 6A illustrates a flow diagram 600A having any one or more of example operations 6002-6016. For example, an operation 502 may include an operation 6002 of announcing an intention to participate in the antenna assembly configuration parameter architecture. For instance, at least one portable wireless node (e.g., a portable wireless node 1002P, such as an Android mobile phone) may announce (e.g., notify, broadcast, transmit, make contact regarding, initialize communication about, notify of availability because of, authenticate with, authorize data exchange with, provide identification of device or user to demonstrate, validate connection with, or a combination thereof, etc.) an intention (e.g., plan, expectation, purpose, capability, willingness, or a combination thereof, etc.) to participate (e.g., join) in an antenna assembly configuration parameter architecture 410 (e.g., a system to enable antenna assembly configuration parameter transfers).

For example, an operation 6002 may include an operation 6004 of announcing an intention to participate in the antenna assembly configuration parameter architecture using at least one application executing on a portable wireless node. For instance, at least one portable wireless node (e.g., a portable wireless node 1002P, such as an Apple iPad) may announce (e.g., notify another of) an intention (e.g., a plan) to participate (e.g., engage) in an antenna assembly configuration parameter architecture 410 (e.g., sharing a database of antenna assembly configuration parameters that is distributed across multiple mobile devices) using at least one application 420 (e.g., an app, a native app, a web browser app, a downloaded app, a set of related instructions, a program, or a combination thereof, etc.) executing on a portable wireless node 1002P (e.g., an Apple iPad).

For example, an operation 6002 may include an operation 6006 of announcing an intention to participate in the antenna assembly configuration parameter architecture using at least one operating system of a portable wireless node. For instance, at least one portable wireless node (e.g., a portable wireless node 1002P, such as an Apple iPhone) may announce (e.g., broadcast) an intention (e.g., a code representing a willingness) to participate in (e.g., contribute to) an antenna assembly configuration parameter architecture 410 (e.g., a proprietary ad hoc mesh network between or among Apple devices enabling a service designed to disseminate antenna assembly configuration parameters known to one or more but not all Apple devices of the ad hoc mesh network) using at least one operating system (OS) 422 (e.g., an Apple iOS for a smart phone or an iPad or an iWatch, a set of instructions incorporated into software that manages computing resources for a device, an Apple OS X for a laptop, or a combination thereof, etc.) of a portable wireless node 1002P (e.g., an Apple iPhone).

For example, an operation 6002 may include an operation 6008 of providing to the at least one cooperative portable wireless node at least one indication of device information for a portable wireless node. For instance, at least one portable wireless node (e.g., a portable wireless node 1002P, such as a Huawei smart phone) may provide (e.g., transmit, reference, supply, proffer, make available, or a combination thereof, etc.) to at least one cooperative (e.g., collaborative) portable wireless node 1002PC (e.g., an at&t personal-Wi-Fi-creating device—such as a so-called personal or mobile hotspot) at least one indication 424 (e.g., description, designation, expression, representation, indirect identification, direct identification, code, universal resource locator (URL) providing a reference or linkage to, signal, value, or a combination thereof, etc.) of device information 426 (e.g., device type (e.g., phone, phablet, tablet, laptop, portable speaker, ground vehicle, aerial vehicle, or a combination thereof, etc.), device make (e.g., manufacturer name or other identification), device model (e.g., Asus laptop, Apple iPad $5^{th}$ Generation or iPhone 6, Dell Inspiron 9200, HP tablet, HTC One smart phone, Huawei feature phone, LG Escape 2013, Motorola Moto X, Nokia 928, Pantech Flex, RIM Blackberry Q10, Samsung Galaxy S4 or Tab 5, a number representing a model, a serial number, or a combination thereof, etc.), antenna assembly type (e.g., 4-part patch antenna, antenna array with 16 elements, phased array antenna, meta-material antenna with 12 control signal antenna junctions, dipole antenna and phased array antenna, 5 GHz patch antenna and 60 GHz meta-material antenna, or a combination thereof, etc.), frequency capability, wireless standard compatibilities, wireless service provider, battery level, current power source, current or anticipated spatial location, orientation position, or a combination thereof, etc.) for a portable wireless node 1002P (e.g., a Huawei smart phone).

For example, an operation 502 may include an operation 6010 of detecting at least one announcement of an intention to participate in the antenna assembly configuration parameter architecture, the at least one announcement sent from the at least one cooperative portable wireless node. For instance, at least one portable wireless node (e.g., a portable wireless node 1002P, such as a Kindle Fire tablet) may detect (e.g., discover, receive, demodulate, ascertain, observe, or a combination thereof, etc.) at least one announcement 428 (e.g., broadcast, notice, transmission, notification, message, declaration, or a combination thereof, etc.) of an intention (e.g., plan, expectation, purpose, capability, willingness, or a combination thereof, etc.) to participate in (e.g., perform an act with respect to) an antenna assembly configuration parameter architecture 410 (e.g., schema enabling parameter sharing), the at least one announcement 428 sent (e.g., transmitted, broadcast, posted, published, or a combination thereof, etc.) from at least one cooperative portable wireless node 1002PC (e.g., an Amazon phone).

For example, an operation 502 may include an operation 6012 of receiving from the at least one cooperative portable wireless node at least one request for one or more antenna assembly configuration parameters. For instance, at least one portable wireless node (e.g., a portable wireless node 1002P, such as an HTC One smart phone) may receive (e.g., accept, decode, demodulate, down-convert, detect, obtain from or via a communication or transmission from another, route from an antenna or antenna element, take into possession wirelessly, or a combination thereof, etc.) from at least one cooperative portable wireless node 1002PC (e.g., an Apple iPhone) at least one request 430 (e.g., message, inquiry, packet asking for cooperation, or a combination thereof, etc.) for one or more antenna assembly configuration parameters 1070 (e.g., at least a portion of an entry from an antenna configuration data structure 1008 (e.g., of FIG. 1E or 1F)).

For example, an operation 6012 may include an operation 6014 of receiving from the at least one cooperative portable wireless node the at least one request for one or more antenna assembly configuration parameters via at least one local wireless connection. For instance, at least one portable wireless node (e.g., a portable wireless node 1002P, such as a Nexus phone) may receive (e.g., extract from a wireless signal) from at least one cooperative portable wireless node 1002PC (e.g., a Chrome laptop) at least one request 430 (e.g., a message) for one or more antenna assembly configuration parameters 1070 (e.g., voltage level settings for a meta-material antenna) via at least one local wireless connection 432 (e.g., a local network, a direct connection, a local area network (LAN), a Bluetooth connection, an NFC connection, an ad hoc Wi-Fi network, a wireless connection that does not travel over the internet or over a telecommunications backbone, a connection over a shared Wi-Fi access point, or a combination thereof, etc.).

For example, an operation 6012 may include an operation 6016 of receiving from the at least one cooperative portable wireless node the at least one request that at least references at least one spatial location. For instance, at least one portable wireless node (e.g., a portable wireless node 1002P, such as an HP Windows 8 tablet) may receive (e.g., accept from an external source) from at least one cooperative portable wireless node 1002P (e.g., a Lenovo laptop) at least one request 430 (e.g., inquiry) that at least references (e.g., links to, provides a handle to, indicates how to determine, includes, or a combination thereof, etc.) at least one spatial location 1072SL (e.g., geographical/geospatial position, elevation position, floor level, room identification, GPS coordinates, distance from known object, height, address, or a combination thereof, etc.).

FIG. 6B illustrates a flow diagram 600B having any one or more of example operations 6020-6034. For example, an operation 502 may include an operation 6020 of identifying the at least one cooperative portable wireless node using at least one remote node. For instance, at least one portable wireless node (e.g., a portable wireless node 1002P, such as an Apple iPhone 5S) may identify (e.g., establish or learn of) at least one cooperative portable wireless node 1002PC (e.g., an Apple iPhone 7) using (e.g., employing, putting into service, relying at least partially on, contacting, retrieving information from, exploiting, registering with to receive updates from, or a combination thereof, etc.) at least one remote node 434 (e.g., a telecommunications node 1014 (e.g., of FIG. 1H), an internet node 1016 (e.g., of FIG. 1D), a gateway, a server, a device providing cloud-computing services, or a combination thereof, etc.).

For example, an operation 6020 may include an operation 6022 of contacting the at least one remote node to ascertain at least one identity of the at least one cooperative portable wireless node. For instance, at least one portable wireless node (e.g., a portable wireless node 1002P, such as an Android-based tablet) may contact (e.g., send a transmission to, receive a message from, petition, register with, accept a list of options from, or a combination thereof, etc.) at least one remote node 434 (e.g., a server farm) to ascertain (e.g., acquire, determine, be informed of, or a combination thereof, etc.) at least one identity 436 (e.g., device name or nickname, device network address (e.g., MAC address), device location, device identification (e.g., IMEI or ESN), phone number, email address, alphanumeric characters providing a mechanism to initiate or participate in wireless communication with, or a combination thereof, etc.) of at least one cooperative portable wireless node 1002PC (e.g., another Android-based device).

For example, an operation 502 may include an operation 6024 of identifying the at least one cooperative portable wireless node as corresponding to at least one compatible antenna assembly configuration parameter. For instance, at least one portable wireless node (e.g., a portable wireless node 1002P, such as a Samsung Galaxy S smart phone) may identify (e.g., classify) at least one cooperative portable wireless node 1002PC (e.g., a Samsung Galaxy Ace smart phone) as corresponding to (e.g., being matched to, being analogous to, being equivalent to, being related to, being linkable to, or a combination thereof, etc.) at least one compatible (e.g., identical, applicable, usable, workable, analogous, adaptable, congruent, capable of using to achieve intended directionality or other wireless communication, same make, same or equivalent model, same or equivalent antenna assembly, or a combination thereof, etc.) antenna assembly configuration parameter 1070 (e.g., operational directives for at least one antenna assembly).

For example, an operation 502 may include an operation 6026 of announcing one or more antenna assembly configuration parameters that are possessed. For instance, at least one portable wireless node (e.g., a portable wireless node 1002P, such as a Nokia smart phone) may announce (e.g., notify about, broadcast, transmit, make contact regarding, initialize communication about, notify of availability because of, authenticate for, authorize data exchange for, provide identification of device or user to obtain, validate connection to acquire, or a combination thereof, etc.) one or more antenna assembly configuration parameters 1070 (e.g., phase shifts particular spatial locations or ranges; particular orientation positions or ranges; other specified conditions 1072 (e.g., of FIG. 1E); or a combination thereof; etc.) that are possessed (e.g., stored on or at or by a device, accessible to a device, have rights to, present in an antenna configuration data structure of, retained, maintained, or a combination thereof, etc.).

For example, an operation 502 may include an operation 6028 of announcing one or more antenna assembly configuration parameters that are desired. For instance, at least one portable wireless node (e.g., a portable wireless node 1002P, such as a Motorola phone) may announce (e.g., notify about, broadcast, transmit, make contact regarding, initialize communication about, notify of availability because of, authenticate for, authorize data exchange for, provide identification of device or user to obtain, validate connection to acquire, or a combination thereof, etc.) one or more antenna assembly configuration parameters 1070 (e.g., selection of antenna elements, junctions, or patches; particular spatial locations or ranges; particular orientation positions or ranges; other specified conditions 1072 (e.g., of FIG. 1E); or a combination thereof; etc.) that are desired (e.g., applicable to one or more current conditions 1072 (e.g., of FIG. 1E), applicable to one or more anticipated future conditions 1072, requested, corresponding to deficient (e.g., empty or out-of-date) entries in an antenna configuration data structure, corresponding to non-existent entries in an antenna configuration data structure, or a combination thereof, etc.).

For example, an operation 504 may include an operation 6030 of communicating locally with the at least one cooperative portable wireless node. For instance, at least one portable wireless node (e.g., a portable wireless node 1002P, such as an Apple Mac Book Air) may communicate (e.g., transmit or receive) locally (e.g., over a local network, over a direct connection, wirelessly without entering the internet or a telecommunications network, wirelessly without propagating through a switch or server of the internet or a telecommunications network, or a combination thereof, etc.) with at least one cooperative portable wireless node 1002PC (e.g., an Apple Air Port Extreme base station).

For example, an operation 6030 may include an operation 6032 of communicating with the at least one cooperative portable wireless node via at least one local network. For instance, at least one portable wireless node (e.g., a portable wireless node 1002P, such as a Huawei phone) may communicate (e.g., impart or accept) with at least one cooperative portable wireless node 1002PC (e.g., an Android-based tablet) via at least one local network 438 (e.g., a peer-to-peer network, an ad hoc network, a mesh network, a device-to-device direct Wi-Fi connection, a local area network (LAN) at least one affiliated access point—such as a same or common Wi-Fi access point, or a combination thereof, etc.).

For example, an operation 6030 may include an operation 6034 of communicating with the at least one cooperative portable wireless node via at least one direct connection. For instance, at least one portable wireless node (e.g., a portable wireless node 1002P, such as a Samsung Galaxy Tab) may communicate (e.g., exchange, broadcast, or process a beacon) with at least one cooperative portable wireless node (e.g., a RIM Blackberry phone) via at least one direct connection 440 (e.g., a Bluetooth connection, a Near Field Communication (NFC) connection, a device-to-device direct Wi-Fi connection, a wireless connection between at least two devices with no intervening device, or a combination thereof, etc.).

Figure 6C:
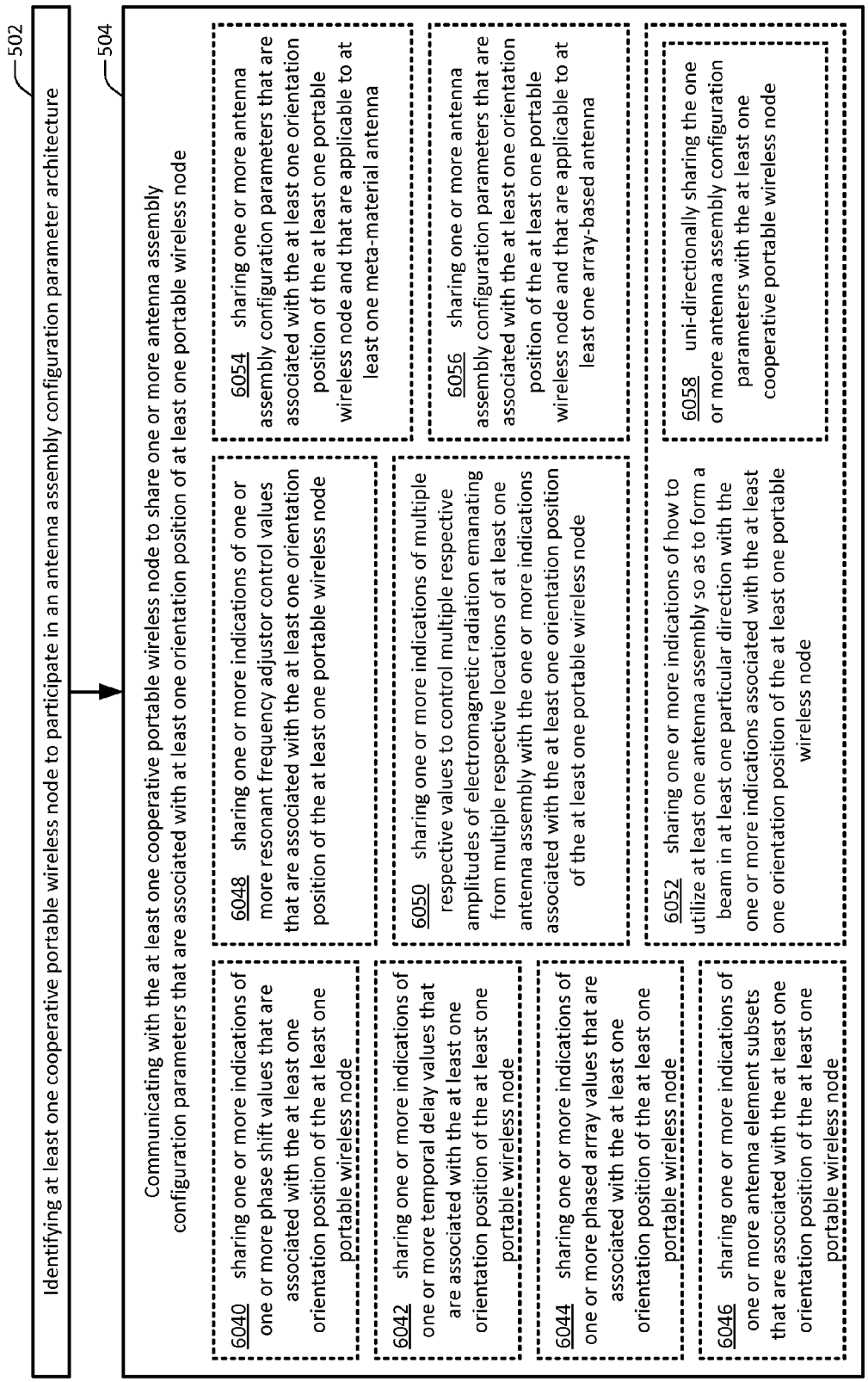

FIG. 6C illustrates a flow diagram 600C having any one or more of example operations 6040-6058. For example, an operation 504 may include an operation 6040 of sharing one or more indications of one or more phase shift values that are associated with the at least one orientation position of the at least one portable wireless node. For instance, at least one portable wireless node (e.g., a portable wireless node 1002P, such as a mobile phone) may share (e.g., transmit, receive, retrieve from memory for forwarding, store into memory after accepting from an external source, exchange, provide, acquire, or a combination thereof, etc.) one or more indications 424 (e.g., identification) of one or more phase shift values 450 (e.g., a number or numerical range, a setting implementing a phase shift, one or more switches or processing to realize a phase shift, a phase delay value, an identification of how or how much to change a phase or a timing of a signal, a selection or length of a signal phase delay line, or a combination thereof, etc.) that are associated with at least one orientation position 10720P (e.g., a 45 degree angle tilt) of at least one portable wireless node (e.g., a same or a different mobile phone).

For example, an operation 504 may include an operation 6042 of sharing one or more indications of one or more temporal delay values that are associated with the at least one orientation position of the at least one portable wireless node. For instance, at least one portable wireless node (e.g., a portable wireless node 1002P, such as a tablet computer) may share (e.g., transmit, receive, retrieve from memory for forwarding, store into memory after accepting from an external source, exchange, provide, acquire, or a combination thereof, etc.) one or more indications 424 (e.g., a listing) of one or more temporal delay values 452 (e.g., a number or numerical range, a setting implementing a temporal delay, one or more switches or processing to realize a temporal delay, a time shifting value, an identification of how or how much to change a timing or a phase of a signal, a selection or length of a signal timing delay line, or a combination thereof, etc.) that are associated with at least one orientation position 10720P (e.g., at least one number representing at least one Euler value) of at least one portable wireless node (e.g., a different tablet computer or a smart phone).

For example, an operation 504 may include an operation 6044 of sharing one or more indications of one or more phased array values that are associated with the at least one orientation position of the at least one portable wireless node. For instance, at least one portable wireless node (e.g., a portable wireless node 1002P, such as a Nokia Lumia phone) may share (e.g., transmit, receive, retrieve from memory for forwarding, store into memory after accepting from an external source, exchange, provide, acquire, or a combination thereof, etc.) one or more indications 424 (e.g., description) of one or more phased array values 454 (e.g., a number or numerical range, a setting implementing directionality or beamforming, one or more switches or processing to realize a directed or beamformed signal, an explanation of how or how much to change a direction or a shape of a signal wave or beam, an identification of which antenna patch or antenna patches to employ, a matrix of values to program operation of an array-based antenna, or a combination thereof, etc.) that are associated with at least one orientation position 10720P (e.g., a cardinal direction such as West to which a screen is facing) of at least one portable wireless node (e.g., the Nokia Lumia phone or a RIM Playbook tablet that is cooperative).

For example, an operation 504 may include an operation 6046 of sharing one or more indications of one or more antenna element subsets that are associated with the at least one orientation position of the at least one portable wireless node. For instance, at least one portable wireless node (e.g., a portable wireless node 1002P, such as a portable screen communicating with a media streaming device) may share (e.g., transmit, receive, retrieve from memory for forwarding, store into memory after accepting from an external source, exchange, provide, acquire, or a combination thereof, etc.) one or more indications 424 (e.g., look-up values) of one or more antenna element subsets 456 (e.g., a listing or group of antenna elements, a listing or group of antenna junctions coupled to antenna elements, a subset of—or less than all of—an available set of antenna elements, a matrix or process coupling less than all available antenna elements to a receive or transmit chain, or a combination thereof, etc.) that are associated with at least one orientation position 10720P (e.g., 30 degrees from vertical and 45 degrees from extending North-to-South) of at least one portable wireless node (e.g., the same portable screen or an associated portable speaker).

For example, an operation 504 may include an operation 6048 of sharing one or more indications of one or more resonant frequency adjustor control values that are associated with the at least one orientation position of the at least one portable wireless node. For instance, at least one portable wireless node (e.g., a portable wireless node 1002P, such as an Android smart phone) may share (e.g., transmit, receive, retrieve from memory for forwarding, store into memory after accepting from an external source, exchange, provide, acquire, or a combination thereof, etc.) one or more indications 424 (e.g., signifiers or numerical values) of one or more resonant frequency adjustor control values 458 (e.g., a number or numerical range, a current, a voltage level, a representation of control input to set a resonant frequency of at least one position on a surface scattering antenna, a matrix or process to establish one or more resonant frequencies of a meta-material antenna—such as for a resonant frequency adjustor 1080 of a meta-material antenna element 1078 thereof (e.g., of FIG. 1C), a setting to control at least a portion of at least one tuner for a meta-material antenna, or a combination thereof, etc.) that are associated with at least one orientation position 10720P (e.g., wherein a normal vector for the screen is 180 degrees opposite to that of a detected gravitational force vector) of at least one portable wireless node (e.g., the same Android smart phone or a different Android smart phone or an Apple iPhone).

For example, an operation 504 may include an operation 6050 of sharing one or more indications of multiple respective values to control multiple respective amplitudes of electromagnetic radiation emanating from multiple respective locations of at least one antenna assembly with the one or more indications associated with the at least one orientation position of the at least one portable wireless node. For instance, at least one portable wireless node (e.g., a portable wireless node 1002P, such as a tablet computer) may share (e.g., transmit, receive, retrieve from memory for forwarding, store into memory after accepting from an external source, exchange, provide, acquire, or a combination thereof, etc.) one or more indications 424 of (e.g., code for or reference to) multiple respective values (e.g., numeral or variable name or table entry) to control multiple respective amplitudes (e.g., magnitude) of electromagnetic radiation (e.g., radio frequency waves) emanating (e.g., transmitting) from multiple respective locations (e.g., position or coordinate or part or element or portion) of at least one antenna assembly 1006 (e.g., at least one antenna with one or more radiating elements, at least one meta-material antenna 1006MM, at least one array-based antenna 1006AR/1006PH, or a combination thereof, etc.) with one or more indications 424 associated with at least one orientation position 10720P (e.g., lying flat and parallel to the earth with a "top" end pointing between 15 and 35 degrees east of north) of at least one portable wireless node (e.g., the same tablet computer or another tablet computer or a phablet).

For example, an operation 504 may include an operation 6052 of sharing one or more indications of how to utilize at least one antenna assembly so as to form a beam in at least one particular direction with the one or more indications associated with the at least one orientation position of the at least one portable wireless node. For instance, at least one portable wireless node (e.g., a portable wireless node 1002P, such as an Apple iWatch) may share (e.g., transmit, receive, retrieve from memory for forwarding, store into memory after accepting from an external source, exchange, provide, acquire, or a combination thereof, etc.) one or more indications 460 (e.g., phase shift value(s), temporal delay value(s), phased array value(s), antenna element subset(s), resonant frequency adjustor control value(s), direction or shape of electromagnetic coverage zone, patch antenna selection(s), antenna junction(s) utilized, or a combination thereof, etc.) of how to utilize (e.g., employ, operate, adjust, apply, exploit, or a combination thereof, etc.) at least one antenna assembly 1006 so as to form a beam (e.g., a focused electromagnetic coverage area) in at least one particular direction (e.g., toward a particular fixed wireless node, in an identified emanation direction with respect to or away from a given portion or part of a portable wireless node, not omni-directionally, a hemispherical pattern (e.g., approximately 180 degrees), a narrow beam, less than 5 or 10 or 30 etc. arc degrees in width with respect to a designated vector, an identified azimuth angle, or a combination thereof, etc.) with one or more indications 460 associated with at least one orientation position 10720P (e.g., up to three specified Euler rotational values) of at least one portable wireless node (e.g., an Apple iWatch or an Apple iPhone).

For example, an operation 6052 may include an operation 6058 of uni-directionally sharing the one or more antenna assembly configuration parameters with the at least one cooperative portable wireless node. For instance, at least one portable wireless node (e.g., a portable wireless node 1002P, such as a portable Wi-Fi-creating device) may uni-directionally (e.g., in at least one direction, send downstream to a connected device, acquire from a downstream device, one device provides while another device accepts, or a combination thereof, etc.) share (e.g., transmit, receive, retrieve from memory for forwarding, store into memory after accepting from an external source, exchange, provide, acquire, or a combination thereof, etc.) one or more antenna assembly configuration parameters 1070 (e.g., a description of antenna operation to produce a 15 degree beam pattern in a specific cardinal direction, such as west-north-west) with at least one cooperative portable wireless node 1002PC (e.g., a Motorola tablet receiving Wi-Fi service from the portable Wi-Fi-creating device).

For example, an operation 504 may include an operation 6054 of sharing one or more antenna assembly configuration parameters that are associated with the at least one orientation position of the at least one portable wireless node and that are applicable to at least one meta-material antenna. For instance, at least one portable wireless node (e.g., a portable wireless node 1002P, such as a user equipment) may share (e.g., transmit, receive, retrieve from memory for forwarding, store into memory after accepting from an external source, exchange, provide, acquire, or a combination thereof, etc.) one or more antenna assembly configuration parameters 1070 (e.g., voltage levels) that are associated with at least one orientation position 10720P (e.g., an Euler angle) of at least one portable wireless node (e.g., a different portable wireless node, such as a mobile station, that is in Bluetooth communication with the user equipment) and that are applicable to at least one meta-material antenna 1006MM (e.g., a surface scattering antenna).

For example, an operation 504 may include an operation 6056 of sharing one or more antenna assembly configuration parameters that are associated with the at least one orientation position of the at least one portable wireless node and that are applicable to at least one array-based antenna. For instance, at least one portable wireless node (e.g., a portable wireless node 1002P, such as a phablet) may share (e.g., transmit, receive, retrieve from memory for forwarding, store into memory after accepting from an external source, exchange, provide, acquire, or a combination thereof, etc.) one or more antenna assembly configuration parameters 1070 (e.g., phase shifts or beam shape or transmission direction) that are associated with at least one orientation position 10720P (e.g., a screen facing within 30 degrees of north and a vector along an identified side of a housing running within 15 degrees of parallel to a gravitational force) of at least one portable wireless node 1002P (e.g., a same phablet) and that are applicable to at least one array-based antenna 1006AR/1006PH/1006* (e.g., a beamforming, phased-array antenna).

Figure 6D:
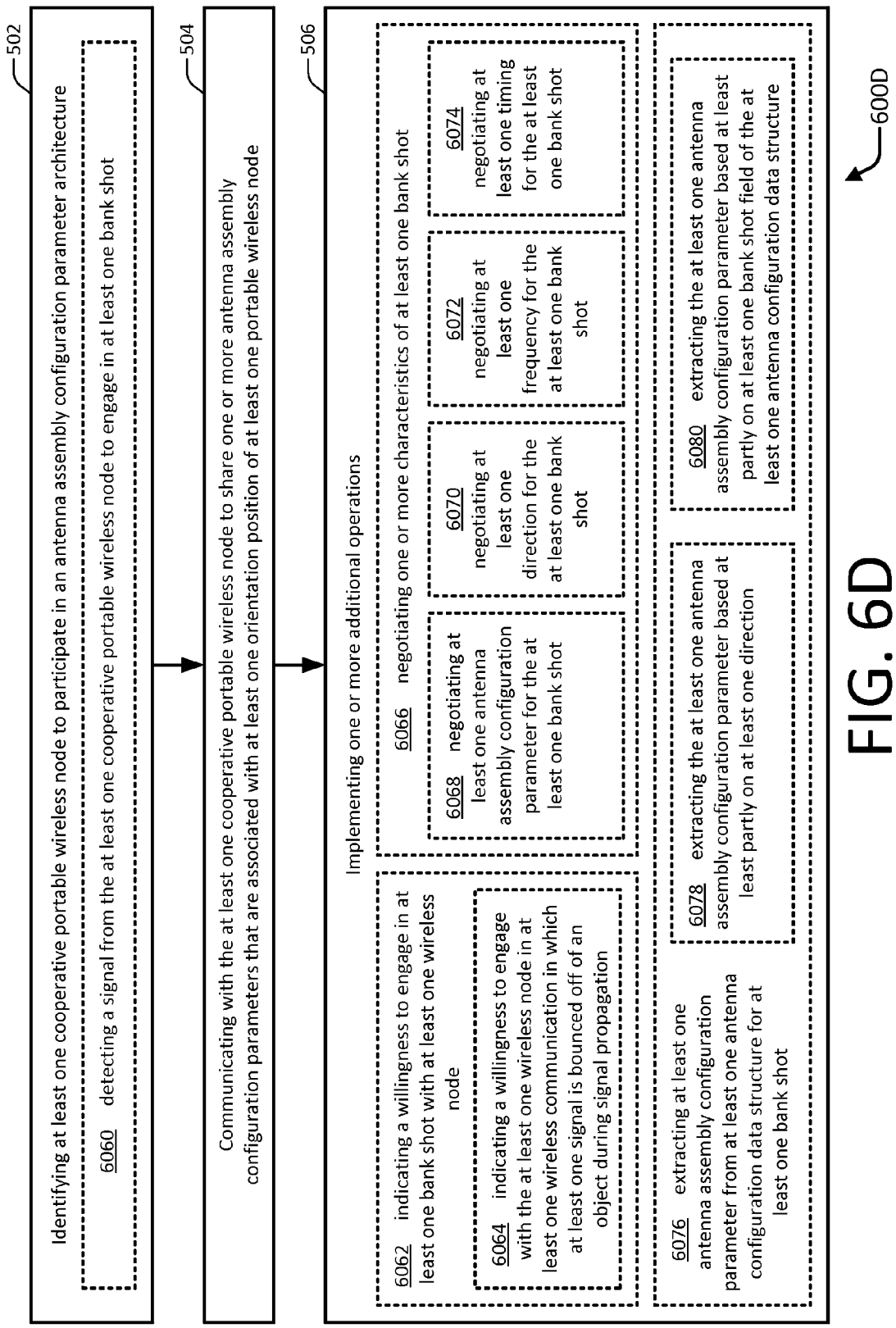

FIG. 6D illustrates a flow diagram 600D having any one or more of example operations 6060-6080. For example, an operation 502 may include an operation 6060 of detecting a signal from the at least one cooperative portable wireless node to engage in at least one bank shot. For instance, at least one portable wireless node (e.g., a portable wireless node 1002P, such as an Apple iPad) may detect (e.g., discover, receive, demodulate, ascertain, observe, or a combination thereof, etc.) a signal 442 (e.g., electromagnetic wave, message, propagating indication, code, wireless communication, or a combination thereof, etc.) from at least one cooperative portable wireless node 1002PC (e.g., an Apple TV device) to engage in at least one bank shot 444 (e.g., a signal reflected off of a wall or other object, a signal that is planned to be received from a targeted or intended reflection, an electromagnetic transmission that is bounced off of an object, a communication that is aimed away from an intended recipient with an expectation that a reflected version of the communication will reach the intended recipient, or a combination thereof, etc.).

For example, an operation 506 may include an operation 6062 of indicating a willingness to engage in at least one bank shot with at least one wireless node. For instance, at least one portable wireless node (e.g., a portable wireless node 1002P, such as a phablet) may indicate (e.g., send a message informing, signal, evidence, connote, or a combination thereof, etc.) a willingness (e.g., agreeability, capability, consent, or a combination thereof, etc.) to engage in (e.g., bring into operation, activate, use, become involved with, employ, or a combination thereof, etc.) at least one bank shot 444 (e.g., a signal reflected off of a wall or other object, a signal that is planned to be received from a targeted or intended reflection, an electromagnetic transmission that is bounced off of an object, a communication that is aimed away from an intended recipient with an expectation that a reflected version of the communication will reach the intended recipient, or a combination thereof, etc.) with at least one wireless node 1002 (e.g., another portable wireless node 1002P1/P2 (e.g., of FIG. 1F) such as a smart phone, a fixed wireless node 1002F1/F2/F3 (e.g., of FIG. 1G) such as an access point, or a combination thereof, etc.).

For example, an operation 6062 may include an operation 6064 of indicating a willingness to engage with the at least one wireless node in at least one wireless communication in which at least one signal is bounced off of an object during signal propagation. For instance, at least one portable wireless node (e.g., a portable wireless node 1002P, such as a Nintendo hand-held gaming device) may indicate (e.g., inform of) a willingness (e.g., capability) to engage (e.g., interact) with at least one wireless node 1002 (e.g., a Wi-Fi access point) in at least one wireless communication 446 (e.g., transmission, reception, exchange of electromagnetic signals, over-the-air transfer of data, or a combination thereof, etc.) in which at least one signal 442 (e.g., electromagnetic wave, message, propagating indication, code, wireless communication, or a combination thereof, etc.) is bounced off (e.g., makes at least partial contact and at least a portion continues after contact, such as in a new direction or at a different signal strength) of an object 448 (e.g., wall, building, bridge, car, furniture, physical item, matter that interacts with—such as at least partially reflecting—electromagnetic waves, tangible material, or a combination thereof, etc.) during signal propagation (e.g., flight, transfer, movement, travel, or a combination thereof, etc. of a signal 442).

For example, an operation 506 may include an operation 6066 of negotiating one or more characteristics of at least one bank shot. For instance, at least one portable wireless node (e.g., a portable wireless node 1002P, such as a Dell tablet) may negotiate (e.g., request, confirm, suggest, stipulate, offer, counter-offer, respond to invitation, modify suggestion, process direction regarding, receive a term, or a combination thereof, etc.) one or more characteristics 462 (e.g., signal strength, frequency, direction, timing, antenna assembly configuration parameter, wireless standard, content, or a combination thereof, etc.) of at least one bank shot 444 (e.g., a signal reflected off of a wall or other object, a signal that is planned to be received from a targeted or intended reflection, an electromagnetic transmission that is bounced off of an object, a communication that is aimed away from an intended recipient with an expectation that a reflected version of the communication will reach the intended recipient, or a combination thereof, etc.).

For example, an operation 6066 may include an operation 6068 of negotiating at least one antenna assembly configuration parameter for the at least one bank shot. For instance, at least one portable wireless node (e.g., a portable wireless node 1002P, such as a data unit for an SUV) may negotiate (e.g., suggest) at least one antenna assembly configuration parameter 1070 (e.g., an antenna assembly and a set of phase delays therefor for a tablet held by a person on the passenger side of a middle row of seats) for at least one bank shot 444 (e.g., a signal reflected off of a B-pillar or a roof of an SUV).

For example, an operation 6066 may include an operation 6070 of negotiating at least one direction for the at least one bank shot. For instance, at least one portable wireless node (e.g., a portable wireless node 1002P, such as a wrist watch) may negotiate (e.g., make a counter-offer with respect to) at least one direction 464 (e.g., angle, vector in space, location with respect to either or both devices engaging in, location for forming an antenna beam, a line pointing away or towards something, an emanation direction, a reception direction, an identified coverage area, or a combination thereof, etc.) for at least one bank shot 444 (e.g., a signal that is planned to be received from a targeted or intended reflection).

For example, an operation 6066 may include an operation 6072 of negotiating at least one frequency for the at least one bank shot. For instance, at least one portable wireless node (e.g., a portable wireless node 1002P, such as an Asus laptop) may negotiate (e.g., request or confirm) at least one frequency 466 (e.g., number of waves per unit of time, 1.8 MHz, 5 GHz, 60 GHz, wireless standard corresponding to a given frequency range, channel corresponding to a particular frequency or frequency range, or a combination thereof, etc.) for at least one bank shot 444 (e.g., an electromagnetic transmission that is bounced off of an object).

For example, an operation 6066 may include an operation 6074 of negotiating at least one timing for the at least one bank shot. For instance, at least one portable wireless node (e.g., a portable wireless node 1002P, such as an Apple iPhone) may negotiate (e.g., respond to an offer regarding) at least one timing 468 (e.g., time slot, channel that corresponds to time, relative time—such as relative to a given transmission, absolute time—such as a time to which devices are synchronized, time length of communication, minimum or maximum time length, time for transceiving (e.g., transmitting, receiving, or a combination thereof, etc.) at a specified direction, or a combination thereof, etc.) for at least one bank shot 444 (e.g., a communication that is aimed away from an intended recipient with an expectation that a reflected version of the communication will reach the intended recipient).

For example, an operation 506 may include an operation 6076 of extracting at least one antenna assembly configuration parameter from at least one antenna configuration data structure for at least one bank shot. For instance, at least one portable wireless node (e.g., a portable wireless node 1002P, such as an Android tablet) may extract (e.g., withdraw, pull out, acquire, retrieve, separate from other, or a combination thereof, etc.) at least one antenna assembly configuration parameter 1070 (e.g., one or more instructions to set up an antenna assembly to form an antenna beam in a particular direction) from at least one antenna configuration data structure 1008 (e.g., a database of conditions 1072 with associated antenna assembly configuration parameters 1070 (e.g., of FIG. 1E) and vice versa) for at least one bank shot 444 (e.g., a signal reflected off of a wall or other object, a signal that is planned to be received from a targeted or intended reflection, an electromagnetic transmission that is bounced off of an object, a communication that is aimed away from an intended recipient with an expectation that a reflected version of the communication will reach the intended recipient, or a combination thereof, etc.).

For example, an operation 6076 may include an operation 6078 of extracting the at least one antenna assembly configuration parameter based at least partly on at least one direction. For instance, at least one portable wireless node (e.g., a portable wireless node 1002P, such a Hon Hai/Foxconn phone) may extract (e.g., withdraw based at least partly on at least one condition) at least one antenna assembly configuration parameter 1070 (e.g., a set of phased array antenna inputs to utilize with an antenna assembly) based at least partly on at least one direction 464 (e.g., a negotiated direction, a known direction for a counterpart wireless node, a direction serving as a condition 1072 (e.g., of FIG. 1E) to input to an antenna configuration data structure 1008 (e.g., of FIGS. 1E and 1F), a vector in space, a direction with respect to or relative to a device or with respect to or relative to a gravitational vector, or a combination thereof, etc.).

For example, an operation 6076 may include an operation 6080 of extracting the at least one antenna assembly configuration parameter based at least partly on at least one bank shot field of the at least one antenna configuration data structure. For instance, at least one portable wireless node (e.g., a portable wireless node 1002P, such as a Motorola tablet) may extract (e.g., acquire by pulling out) at least one antenna assembly configuration parameter 1070 (e.g., resonant frequency adjustor control value for a resonant frequency adjustor 1080 (e.g., of FIG. 1C)) based at least partly on at least one bank shot field 470 (e.g., at least a portion of an entry adapted to describe or define a bank shot 444, a portion of a data structure that includes at least one indicator that an entry or a part thereof is applicable to a bank shot, a condition 1072 that indicates that an associated antenna assembly configuration parameter sets up a bank shot for wireless communication—such as with a targeted counterpart wireless node, a block that identifies an object off of which a signal is to be bounced, a code that indicates that a field pertains to parameters for wireless communication with a device for which there is not a sufficiently clear line-of-sight, or a combination thereof, etc.) of at least one antenna configuration data structure 1008 (e.g., a table or spreadsheet or SQL database having one or more conditions that are associated with at least one antenna assembly configuration parameter).

Figure 6E:
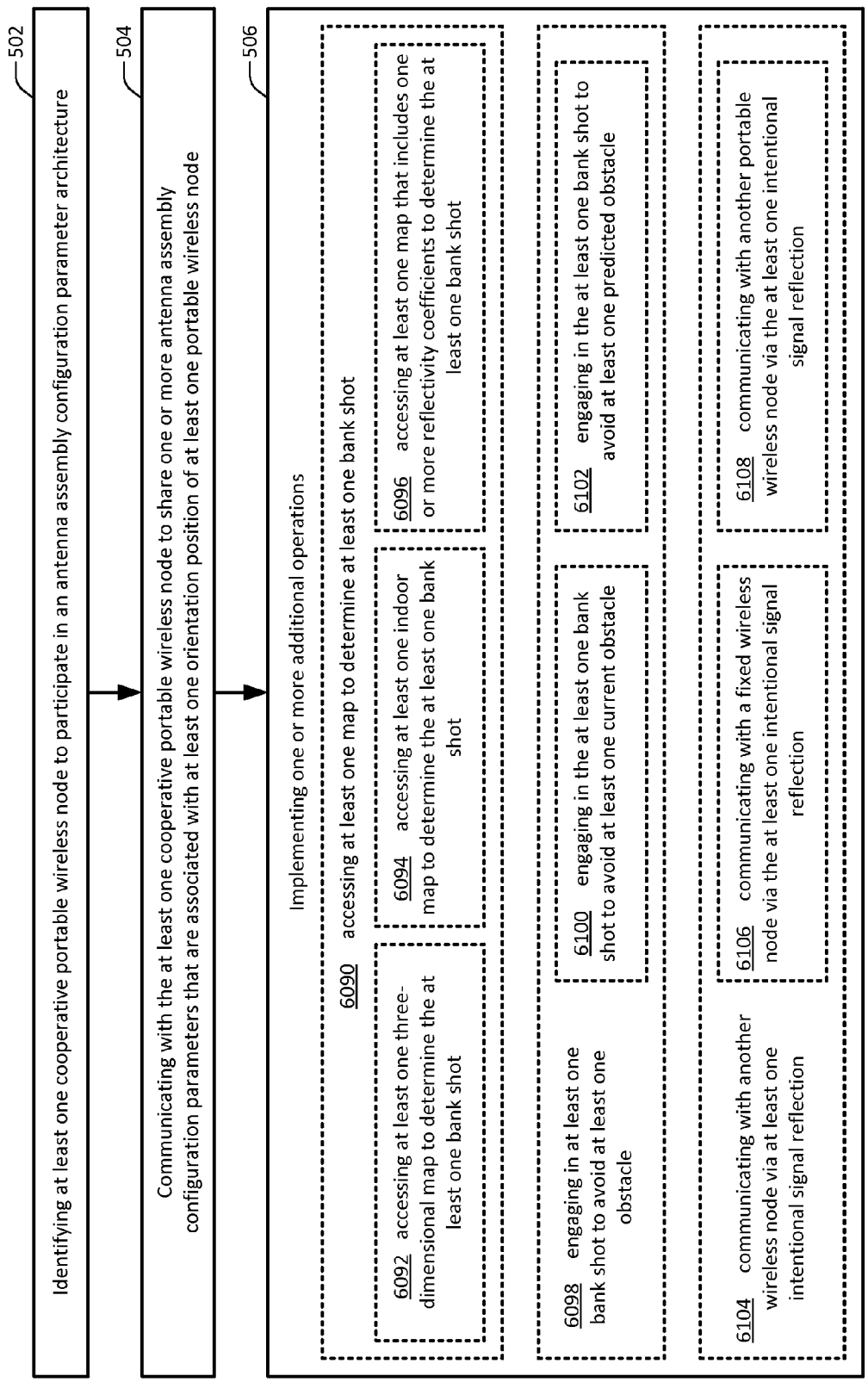

FIG. 6E illustrates a flow diagram 600E having any one or more of example operations 6090-6108. For example, an operation 506 may include an operation 6090 of accessing at least one map to determine at least one bank shot. For instance, at least one portable wireless node (e.g., a portable wireless node 1002P, such as a Samsung Galaxy Active) may access (e.g., consult, load-in, process, acquire data from, or a combination thereof, etc.) at least one map 472 (e.g., symbolic representation of actual world, virtual description of space or contents thereof, geospatial data, locations of objects in world, data structure indicating items—such as roads, buildings, walls, furniture, wireless nodes, or topographical features—present in a given area, chart, projection, or a combination thereof, etc.) to determine (e.g., ascertain, calculate, conclude, deduce, decide upon, compute, estimate, produce plans for, or a combination thereof, etc.) at least one bank shot 444 (e.g., a signal reflected off of a wall or other object, a signal that is planned to be received from a targeted or intended reflection, an electromagnetic transmission that is bounced off of an object, a communication that is aimed away from an intended recipient with an expectation that a reflected version of the communication will reach the intended recipient, or a combination thereof, etc.).

For example, an operation 6090 may include an operation 6092 of accessing at least one three-dimensional map to determine the at least one bank shot. For instance, at least one portable wireless node (e.g., a portable wireless node 1002P, such as a tablet computer) may access (e.g., consult) at least one three-dimensional (e.g., indicating distances along three axes—such as height, width, and length; having at least three values for spatial coordinates; having elevation as well as coordinates on earth's surface; using spherical coordinates; or a combination thereof; etc.) map (e.g., symbolic representation of actual world) 472-3D to determine (e.g., ascertain) at least one bank shot 444 (e.g., a signal reflected off of a wall or other object).

For example, an operation 6090 may include an operation 6094 of accessing at least one indoor map to determine the at least one bank shot. For instance, at least one portable wireless node (e.g., a portable wireless node 1002P, such as a laptop computer) may access (e.g., load-in) at least one indoor (e.g., within a building, showing walls or doors, indicating floor or ceilings, representing furniture or cabinets, or a combination thereof, etc.) map (e.g., virtual description of space or contents thereof) 472-ID to determine (e.g., produce plans for) at least one bank shot 444 (e.g., an electromagnetic transmission that is bounced off of an object).

For example, an operation 6090 may include an operation 6096 of accessing at least one map that includes one or more reflectivity coefficients to determine the at least one bank shot. For instance, at least one portable wireless node (e.g., a portable wireless node 1002P, such as a smart phone) may access (e.g., process) at least one map 472 (e.g., data structure indicating items—such as roads, buildings, walls, furniture, wireless nodes, or topographical features—present in a given area) that includes one or more reflectivity coefficients 474 (e.g., values, variables, algebraic representations, or a combination thereof, etc. that indicate or model how, to what extent, in which direction, or a combination thereof, etc. a signal that impacts an object is at least likely to bounce off of the object) to determine (e.g., compute) at least one bank shot 444 (e.g., a signal that is planned to be received from a targeted or intended reflection).

For example, an operation 506 may include an operation 6098 of engaging in at least one bank shot to avoid at least one obstacle. For instance, at least one portable wireless node (e.g., a portable wireless node 1002P, such as an Amazon tablet or smart phone) may engage in (e.g., bring into operation, activate, use, become involved with, employ, or a combination thereof, etc.) at least one bank shot 444 (e.g., a signal reflected off of a wall or other object, a signal that is planned to be received from a targeted or intended reflection, an electromagnetic transmission that is bounced off of an object, a communication that is aimed away from an intended recipient with an expectation that a reflected version of the communication will reach the intended recipient, or a combination thereof, etc.) to avoid (e.g., stay away from, keep clear of, not impact, prevent blocking by, at least reduce interference caused by, dodge, circumvent, at least partly bypass, or a combination thereof, etc.) at least one obstacle 476 (e.g., object, a material that causes interference, something that may block at least partially, barrier, impediment, wall, building, flesh, lampshade, vehicle, or a combination thereof, etc.).

For example, an operation 6098 may include an operation 6100 of engaging in the at least one bank shot to avoid at least one current obstacle. For instance, at least one portable wireless node (e.g., a portable wireless node 1002P, such as an LG smart phone) may engage in (e.g., activate) at least one bank shot 444 (e.g., a communication that is aimed away from an intended recipient with an expectation that a reflected version of the communication will reach the intended recipient) to avoid (e.g., prevent complete blocking by) at least one current (e.g., contemporaneous, present time, occurring or being experienced now, actual, observable or detectable in the present, or a combination thereof, etc.) obstacle (e.g., barrier) 476-C.

For example, an operation 6098 may include an operation 6102 of engaging in the at least one bank shot to avoid at least one predicted obstacle. For instance, at least one portable wireless node (e.g., a portable wireless node 1002P, such as a Sony hand-held entertainment device) may engage in (e.g., employ) at least one bank shot 444 (e.g., an electromagnetic transmission that is bounced off of an object) to avoid (e.g., at least reduce interference caused by) at least one predicted (e.g., expected in the future, prophesied, estimated to cause at last greater interference in a coming moment, forecasted based on movement of either or both communicating wireless nodes, forecasted based on movement of another object—such as an oncoming truck, anticipated, or a combination thereof, etc.) obstacle (e.g., at least partially blocking object) 476-P.

For example, an operation 506 may include an operation 6104 of communicating with another wireless node via at least one intentional signal reflection. For instance, at least one portable wireless node (e.g., a portable wireless node 1002P, such as an Apple iPhone) may communicate (e.g., impart, transmit, receive, exchange, broadcast, accept delivery, send, or a combination, thereof, etc. information, data, knowledge, bits, or a combination thereof, etc.) with another wireless node 1002 (e.g., another portable wireless node 1002P1/P2 (e.g., of FIG. 1F) such as a smart phone, a fixed wireless node 1002F1/F2/F3 (e.g., of FIG. 1G or 1K) such as an access point, or a combination thereof, etc.) via at least one intentional (e.g., result or consequence of a plan, protocol, procedure, action, or a combination thereof, etc. derived from negotiation, experimentation, information in a data structure, or a combination thereof, etc.) signal reflection (e.g., a signal 442 that has been bounced, rebounded, ricocheted, cast back, or a combination thereof, etc. from or off of at least one object or surface) 478.

For example, an operation 6104 may include an operation 6106 of communicating with a fixed wireless node via the at least one intentional signal reflection. For instance, at least one portable wireless node (e.g., a portable wireless node 1002P, such as an Apple iWatch) may communicate with (e.g., receive data from) a fixed wireless node 1002F1/F2/F3 (e.g., of FIG. 1G or 1K) (e.g., an access point, a base station, a stationary repeater, or a combination thereof, etc.) via at least one intentional signal reflection 478 (e.g., a planned ricochet of an electromagnetic emanation off of a file cabinet between the iWatch and the access point).

For example, an operation 6104 may include an operation 6108 of communicating with another portable wireless node via the at least one intentional signal reflection. For instance, at least one portable wireless node (e.g., a portable wireless node 1002P, such as an Apple iPod or a portable speaker) may communicate (e.g., exchange bits) with another portable wireless node 1002P1/P2 (e.g., of FIG. 1F) (e.g., a smart phone, a table computer, a computerized pair of glasses, a UAV, or a combination thereof, etc.) via at least one intentional signal reflection 478 (e.g., a negotiated bouncing of a wireless signal between an Apple iPod and a smart phone against and off of a building to avoid potential interference from an approaching bicycle).

FIG. 6F illustrates a flow diagram 600F having any one or more of example operations 6120-6132. For example, an operation 506 may include an operation 6120 of controlling one or more communication characteristics of at least one other portable wireless node. For instance, at least one portable wireless node (e.g., a portable wireless node 1002P, such as a Samsung smart phone) may control (e.g., cause to operate in a desired manner, regulate behavior, exercise direction over, send instruction to, order to perform one or more acts, command with a reasonable expectation of compliance—such as if command authority has been granted or negotiated for, direct other devices as a local wireless coordinator, or a combination thereof, etc.) one or more communication characteristics 480 (e.g., communication timing—such as a timeslot for transmission, communication frequency—such as a channel corresponding to a frequency band, antenna beam attributes—such as beam shape or direction, wireless standard adherence, modulation technique, channel protocol, signal strength, or a combination thereof, etc.) of at least one other portable wireless node 1002P-O (e.g., an HTC smart phone).

For example, an operation 6120 may include an operation 6122 of transmitting one or more control signals to the at least one other portable wireless node to control the one or more communication characteristics of the at least one other portable wireless node. For instance, at least one portable wireless node (e.g., a portable wireless node 1002P, such as an Apple iPad) may transmit (e.g., send, communicate wirelessly, frequency up-convert, modulate, encode, propagate, emanate from an emitter or antenna or network port, or a combination thereof, etc.) one or more control signals 482 (e.g., command, message, electromagnetic emanation or reception, or a combination thereof, etc. that is capable of or adapted to control—such as cause to operate in a desired manner—another device remotely) to at least one other portable wireless node 1002P-O (e.g., an Acer laptop) to control (e.g., order to perform one or more acts to establish) one or more communication characteristics 480 (e.g., a beam of a specified direction at an identified frequency) of at least one other portable wireless node 1002P-O (e.g., an Acer laptop).

For example, an operation 6120 may include an operation 6124 of controlling at least one communication timing of the at least one other portable wireless node. For instance, at least one portable wireless node (e.g., a portable wireless node 1002P, such as a Kindle Fire tablet) may control (e.g., regulate behavior of) at least one communication timing 480-CT (e.g., time slot, channel that corresponds to time, relative time—such as relative to a given transmission, absolute time—such as a time to which devices are synchronized, time length of communication, minimum or maximum time length, time for transceiving (e.g., transmitting, receiving, or a combination thereof, etc.) at a general or at a specified direction, or a combination thereof, etc.) of at least one other portable wireless node 1002P-O (e.g., a Microsoft Surface tablet).

For example, an operation 6120 may include an operation 6126 of controlling at least one communication frequency of the at least one other portable wireless node. For instance, at least one portable wireless node (e.g., a portable wireless node 1002P, such as a Dell laptop) may control (e.g., exercise direction over to order) at least one communication frequency 480-CF (e.g., number of waves per unit of time, 1.8 MHz, 5 GHz, 60 GHz, wireless standard corresponding to a given frequency range, channel corresponding to a particular frequency or frequency range, or a combination thereof, etc.) of at least one other portable wireless node 1002P-O (e.g., a RIM Blackberry smart phone).

For example, an operation 6120 may include an operation 6128 of controlling at least one beam attribute of the at least one other portable wireless node. For instance, at least one portable wireless node (e.g., a portable wireless node 1002P, such as a Nokia Lumia smart phone) may control (e.g., command with a reasonable expectation of compliance—such as if command authority has been granted or negotiated for—to engage a beam having) at least one beam attribute 480-BA (e.g., beam direction, beam physicality—such as shape, beam motility—such as stationary or moving, or a combination thereof, etc.) of at least one other portable wireless node 1002P-O (e.g., a wireless device worn on a wrist).

For example, an operation 6128 may include an operation 6130 of controlling at least one beam direction of the at least one other portable wireless node. For instance, at least one portable wireless node (e.g., a portable wireless node 1002P, such as an Apple iWatch) may control (e.g., direct other devices as a local wireless coordinator to adopt) at least one beam direction 480-BA-D (e.g., angle, vector in space, location with respect to either or both devices engaging in a communication, a number of degrees or radians, location for forming an antenna beam, identified target to aim an antenna beam, a line pointing away or towards something, an emanation direction, a reception direction, or a combination thereof, etc.) of at least one other portable wireless node 1002P-O (e.g., an Apple iPad).

For example, an operation 6128 may include an operation 6132 of controlling at least one beam physicality of the at least one other portable wireless node. For instance, at least one portable wireless node (e.g., a portable wireless node 1002P, such as a Samsung Galaxy Tab tablet) may control (e.g., send instruction to implement a specified) at least one beam physicality 480-BA-P (e.g., shape, size, width, length, height, coverage area or volume, or a combination thereof, etc.) of at least one other portable wireless node 1002P-O (e.g., a Samsung Galaxy S smart phone).

FIG. 6G illustrates a flow diagram 600G having any one or more of example operations 6140-6152. For example, an operation 506 may include an operation 6140 of controlling one or more communication characteristics of multiple other portable wireless nodes. For instance, at least one portable wireless node (e.g., a portable wireless node 1002P, such as a Samsung Galaxy S smart phone) may control (e.g., cause to operate in a desired manner, regulate behavior, exercise direction over, send instruction to, order to perform one or more acts, command with a reasonable expectation of compliance—such as if command authority has been granted or negotiated for, direct other devices as a local wireless coordinator, or a combination thereof, etc.) one or more communication characteristics 480 (e.g., communication timing—such as a timeslot for transmission, communication frequency—such as a channel corresponding to a frequency band, antenna beam attributes—such as beam shape or direction, wireless standard adherence, modulation technique, channel protocol, signal strength, or a combination thereof, etc.) of multiple other portable wireless nodes 1002P-O (e.g., a Samsung Galaxy Tab tablet computer and an HTC One smart phone).

For example, an operation 506 may include an operation 6142 of assigning one or more beam attributes based at least partly on at least one portable wireless node velocity aspect. For instance, at least one portable wireless node (e.g., a portable wireless node 1002P, such as a Nexus smart phone) may assign (e.g., allocate, designate, give out, allot, charge or obligate, order adoption of, send an instruction to engage in a communication including, or a combination thereof, etc.) one or more beam attributes 480-BA (e.g., beam direction, beam physicality—such as shape, beam motility—such as stationary or moving, or a combination thereof, etc.) based at least partly on at least one portable wireless node 1002P/1002P-O/1002P-P/1002P-D/1002P1/1002P2 (e.g., of FIG. 1F or 4D) velocity aspect 484 (e.g., speed, direction, magnitude of velocity, angle of velocity vector, rate of change of position, 15 m/s, 1 m/s, 30 miles per hour, or a combination thereof, etc.).

For example, an operation 6142 may include an operation 6144 of assigning a narrow beam to a particular portable wireless node based at least partly on a determination that the particular portable wireless node is substantially stationary. For instance, at least one portable wireless node (e.g., a portable wireless node 1002P, such as an Android-based smart phone) may assign (e.g., allot) a narrow beam 1028-N (e.g., a beam focused to target a particular portable wireless node, a beam approximately equal to or less than a hemispherical transmission, a beam tailored such that a center lobe avoids coverage or appreciable interference with non-targeted portable wireless nodes, or a combination thereof, etc.) to a particular portable wireless node (PWN) 1002P-P (e.g., a Windows Phone-based smart phone) based at least partly on a determination (e.g., ascertainment, calculation, conclusion, deducement, computation, estimation, or a combination thereof, etc.) that particular portable wireless node 1002P-P is substantially (e.g., to a technically-capable level of determination, relative to a speed at which a beam may be aimed or moved, as is determinable based on obtainable data, essentially, or a combination thereof, etc.) stationary (e.g., not changing position, immobile, less than 0.5 meters per second, unchanging location, device at rest on a table, or a combination thereof, etc.).

For example, an operation 6142 may include an operation 6146 of assigning one or more beam attributes to a particular portable wireless node based at least partly on at least one velocity aspect of a different portable wireless node. For instance, at least one portable wireless node (e.g., a portable wireless node 1002P, such as an Apple Mac Book Pro) may assign (e.g., designate or order adoption of) one or more beam attributes 480-BA (e.g., beam direction, beam physicality—such as shape, beam motility—such as stationary or moving, or a combination thereof, etc.) to a particular portable wireless node (PWN) 1002P-P (e.g., an Apple iPad) based at least partly on at least one velocity aspect 484 (e.g., speed, direction, magnitude of velocity, angle of velocity vector, rate of change of position, 15 m/s, 1 m/s, 30 miles per hour, or a combination thereof, etc.) of a different portable wireless node (PWN) 1002P-D (e.g., an Apple iPhone).

For example, an operation 506 may include an operation 6148 of assigning one or more communication characteristics to a particular portable wireless node based at least partly on a location of a different portable wireless node. For instance, at least one portable wireless node (e.g., a portable wireless node 1002P, such as an LG smart phone) may assign (e.g., allocate, designate, give out, allot, charge or obligate, order adoption of, send an instruction to engage in a communication including, or a combination thereof, etc.) one or more communication characteristics 480 (e.g., communication timing—such as a timeslot for transmission, communication frequency—such as a channel corresponding to a frequency band, antenna beam attributes—such as beam shape or direction, wireless standard adherence, modulation technique, channel protocol, signal strength, or a combination thereof, etc.) to a particular portable wireless node (PWN) 1002P-P based at least partly on a location 486 (e.g., satellite positioning system (SPS)—such as global positioning system (GPS)—coordinates, position in a room—such as at a piece of furniture, distance or direction from a known position—such as a corner of a room or a stationary access point, address, any of the above with a margin of error or uncertainty, or a combination thereof, etc.) of a different portable wireless node (PWN) 1002P-D.

For example, an operation 506 may include an operation 6150 of determining at least one direction to aim at least one beam at a particular portable wireless node based at least partly on transmissions of multiple beams having multiple respective indicators. For instance, at least one portable wireless node (e.g., a portable wireless node 1002P, such as a Samsung Galaxy S phone) may determine (e.g., ascertain, calculate, conclude, deduce, decide upon, compute, estimate, produce plans for, or a combination thereof, etc.) at least one direction 488 (e.g., angle, vector in space, location with respect to either or both devices engaging in a communication, location for forming an antenna beam, a line pointing away or towards something, an emanation direction, a reception direction, an identified coverage area, or a combination thereof, etc.) to aim (e.g., point, position, strive to place, attempt to establish, or a combination thereof, etc.) at least one beam 1028 (e.g., focused electromagnetic communication, directed emanation or reception, antenna beam pattern, coverage area for RF signaling, non-omnidirectional wireless communication, or a combination thereof, etc.) at a particular portable wireless node (PWN) 1002P-P (e.g., a Samsung Galaxy Note) based at least partly on transmissions (e.g., emanation, transference, engagement, sending out, or a combination thereof, etc.) of multiple beams 1028 having multiple respective indicators 490 (e.g., designation, expression, alphanumeric identifier, indirect identification, direct identification, modulation difference, reference, code, value, or a combination thereof, etc.).

For example, an operation 506 may include an operation 6152 of determining at least one direction to aim at least one beam at a particular portable wireless node based at least partly on sweeping beam transmissions along a horizontal path and slicing beam transmissions along a vertical path. For instance, at least one portable wireless node (e.g., a portable wireless node 1002P, such as a Motorola smart phone) may determine (e.g., ascertain, calculate, conclude, deduce, decide upon, compute, estimate, produce plans for, or a combination thereof, etc.) at least one direction 488 (e.g., angle, vector in space, location with respect to either or both devices engaging in a communication, location for forming an antenna beam, a line pointing away or towards something, an emanation direction, a reception direction, an identified coverage area, or a combination thereof, etc.) to aim (e.g., point, position, strive to place, attempt to establish, or a combination thereof, etc.) at least one beam 1028 (e.g., focused electromagnetic communication, directed emanation or reception, antenna beam pattern, coverage area for RF signaling, non-omnidirectional wireless communication, or a combination thereof, etc.) at a particular portable wireless node (PWN) 1002P-P (e.g., a Samsung tablet) based at least partly on sweeping (e.g., moving, gliding, passing over with smooth movement in an arc, or a combination thereof, etc.) beam transmissions (e.g., emanation, transference, engagement, sending out, or a combination thereof, etc. of at least one beam) along a horizontal path (e.g., left-to-right or vice versa, along a horizon, along an azimuth angle, or a combination thereof, etc.) and slicing (e.g., moving, gliding, passing over with smooth movement in an arc, or a combination thereof, etc.) beam transmissions along a vertical path (e.g., high-to-low or vice versa, up or down, along an angle of elevation, or a combination thereof, etc.).

Those skilled in the art will appreciate that the foregoing specific exemplary processes and/or machines and/or technologies are representative of more general processes and/or machines and/or technologies taught elsewhere herein, such as in the claims filed herewith and/or elsewhere in the present application.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

This application may make reference to one or more trademarks, e.g., a word, letter, symbol, or device adopted by one manufacturer or merchant and used to identify and distinguish his or her product from those of others. Trademark names used herein are set forth in such language that makes clear their identity, that distinguishes them from common descriptive nouns, that have fixed and definite meanings, and, in many if not all cases, are accompanied by other specific identification using terms not covered by trademark. In addition, trademark names used herein have meanings that are well-known and defined in the literature, and do not refer to products or compounds protected by trade secrets in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or [trade], even when such trademark symbol does not explicitly appear next to the trademark. To the extent a trademark is used in a descriptive manner to refer to a product or process, that trademark should be interpreted to represent the corresponding product or process as of the date of the filing of this patent application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
   circuitry configured for receiving at least one indication of at least one anticipated communication;
   circuitry configured for identifying at least one cooperative portable wireless node to participate in an antenna assembly configuration parameter architecture in association with the at least one anticipated communication;
   circuitry configured for selecting at least one frequency for the at least one anticipated communication at least partially based on at least one wavelength of at least one antenna associated with the antenna assembly configuration parameter architecture;
   circuitry configured for sharing one or more antenna assembly configuration parameters with the at least one cooperative portable wireless node via at least one frequency other than the selected at least one frequency for the at least one anticipated communication; and
   circuitry configured for controlling at least one characteristic of the at least one antenna assembly configuration parameter architecture at least partially based on the one or more antenna assembly configuration parameters.

2. The system of claim 1, wherein circuitry configured for identifying at least one cooperative portable wireless node to participate in an antenna assembly configuration parameter architecture in association with the at least one anticipated communication comprises:
   circuitry configured for announcing an intention to participate in the antenna assembly configuration parameter architecture.

3. The system of claim 2, wherein circuitry configured for announcing an intention to participate in the antenna assembly configuration parameter architecture comprises:
   circuitry configured for providing to the at least one cooperative portable wireless node at least one indication of device information for a portable wireless node, the at least one indication of device information including at least one indication of frequency capability of the portable wireless node.

4. The system of claim 1, wherein circuitry configured for identifying at least one cooperative portable wireless node to participate in an antenna assembly configuration parameter architecture in association with the at least one anticipated communication comprises:
   circuitry configured for detecting at least one announcement of an intention to participate in the antenna assembly configuration parameter architecture in association with the at least one anticipated communication, the at least one announcement sent from the at least one cooperative portable wireless node.

5. The system of claim 1, wherein circuitry configured for identifying at least one cooperative portable wireless node to participate in an antenna assembly configuration parameter architecture in association with the at least one anticipated communication comprises:
   circuitry configured for receiving from the at least one cooperative portable wireless node at least one request for one or more antenna assembly configuration parameters.

6. The system of claim 5, wherein circuitry configured for receiving from the at least one cooperative portable wireless node at least one request for one or more antenna assembly configuration parameters comprises:
   circuitry configured for receiving from the at least one cooperative portable wireless node the at least one request for one or more antenna assembly configuration parameters via at least one local wireless connection that uses at least one frequency other than a frequency matching at least one wavelength related to at least one antenna of the at least one cooperative portable wireless node.

7. The system of claim 5, wherein circuitry configured for receiving from the at least one cooperative portable wireless node at least one request for one or more antenna assembly configuration parameters comprises:
   circuitry configured for receiving from the at least one cooperative portable wireless node the at least one request that at least references at least one spatial location.

8. The system of claim 1, wherein circuitry configured for identifying at least one cooperative portable wireless node to participate in an antenna assembly configuration parameter architecture in association with the at least one anticipated communication comprises:
   circuitry configured for identifying the at least one cooperative portable wireless node using at least one remote node.

9. The system of claim 8, wherein circuitry configured for identifying the at least one cooperative portable wireless node using at least one remote node comprises:
   circuitry configured for contacting the at least one remote node to ascertain at least one identity of the at least one cooperative portable wireless node.

10. The system of claim 1, wherein circuitry configured for identifying at least one cooperative portable wireless node to participate in an antenna assembly configuration parameter architecture in association with the at least one anticipated communication comprises:
    circuitry configured for identifying the at least one cooperative portable wireless node as corresponding to at least one compatible antenna assembly configuration parameter, including at least identifying the at least one cooperative portable wireless node as capable of communicating via at least one frequency matched to at least one wavelength related to at least one antenna associated with the antenna assembly configuration parameter architecture.

11. The system of claim 1, wherein circuitry configured for identifying at least one cooperative portable wireless node to participate in an antenna assembly configuration parameter architecture in association with the at least one anticipated communication comprises:
    circuitry configured for announcing one or more antenna assembly configuration parameters that are at least one of possessed or desired.

12. The system of claim 1, wherein circuitry configured for sharing one or more antenna assembly configuration parameters with the at least one cooperative portable wireless node via at least one frequency other than the selected at least one frequency for the at least one anticipated communication comprises:
    circuitry configured for communicating locally with the at least one cooperative portable wireless node to share the one or more antenna assembly configuration parameters, including at least communicating via at least one frequency other than a frequency indicated by the antenna assembly configuration parameter architecture.

13. The system of claim 1, wherein circuitry configured for sharing one or more antenna assembly configuration parameters with the at least one cooperative portable wireless node via at least one frequency other than the selected at least one frequency for the at least one anticipated communication comprises:
circuitry configured for sharing one or more indications of at least one of one or more phased array values, one or more resonant frequency adjustor control values, or one or more antenna element subsets associated with at least one orientation position of the at least one cooperative portable wireless node.

14. The system of claim 1, wherein circuitry configured for sharing one or more antenna assembly configuration parameters with the at least one cooperative portable wireless node via at least one frequency other than the selected at least one frequency for the at least one anticipated communication comprises:
circuitry configured for sharing one or more indications of how to utilize at least one antenna assembly so as to form a beam in at least one particular direction with one or more indications associated with at least one orientation position of the at least one cooperative portable wireless node.

15. The system of claim 14, wherein circuitry configured for sharing one or more indications of how to utilize at least one antenna assembly so as to form a beam in at least one particular direction with one or more indications associated with at least one orientation position of the at least one cooperative portable wireless node comprises:
circuitry configured for uni-directionally sharing the one or more antenna assembly configuration parameters with the at least one cooperative portable wireless node.

16. The system of claim 1, wherein circuitry configured for identifying at least one cooperative portable wireless node to participate in an antenna assembly configuration parameter architecture in association with the at least one anticipated communication comprises:
circuitry configured for detecting at least one signal from the at least one cooperative portable wireless node to engage in at least one bank shot.

17. The system of claim 1, wherein circuitry configured for communicating sharing one or more antenna assembly configuration parameters with the at least one cooperative portable wireless node via at least one frequency other than the selected at least one frequency for the at least one anticipated communication comprises:
circuitry configured for indicating a willingness to engage in at least one bank shot with at least one wireless node.

18. The system of claim 1, wherein circuitry configured for sharing one or more antenna assembly configuration parameters with the at least one cooperative portable wireless node via at least one frequency other than the selected at least one frequency for the at least one anticipated communication comprises:
circuitry configured for negotiating one or more characteristics of at least one bank shot.

19. The system of claim 18, wherein circuitry configured for negotiating one or more characteristics of at least one bank shot comprises:
circuitry configured for negotiating one or more of at least one direction, at least one frequency, or at least one timing for the at least one bank shot.

20. The system of claim 1, wherein circuitry for controlling at least one characteristic of the at least one antenna assembly configuration parameter architecture at least partially based on the one or more antenna assembly configuration parameters comprises:
circuitry configured for extracting at least one antenna assembly configuration parameter from at least one antenna configuration data structure for at least one bank shot.

21. The system of claim 20, wherein circuitry configured for extracting at least one antenna assembly configuration parameter from at least one antenna configuration data structure for at least one bank shot comprises:
circuitry configured for extracting the at least one antenna assembly configuration parameter at least partially based on at least one bank shot field of the at least one antenna configuration data structure.

22. The system of claim 1, wherein circuitry for controlling at least one characteristic of the at least one antenna assembly configuration parameter architecture at least partially based on the one or more antenna assembly configuration parameters comprises:
circuitry configured for accessing at least one map to determine at least one bank shot.

23. The system of claim 22, wherein circuitry configured for accessing at least one map to determine at least one bank shot comprises:
circuitry configured for accessing at least one map that includes one or more reflectivity coefficients to determine the at least one bank shot.

24. The system of claim 1, wherein circuitry configured for controlling at least one characteristic of the at least one antenna assembly configuration parameter architecture at least partially based on the one or more antenna assembly configuration parameters comprises:
circuitry configured for engaging in at least one bank shot to avoid one or more of at least one obstacle or at least one predicted obstacle.

25. The system of claim 1, further comprising:
circuitry configured for communicating with another wireless node via at least one intentional signal reflection.

26. The system of claim 1, wherein circuitry configured for controlling at least one characteristic of the at least one antenna assembly configuration parameter architecture at least partially based on the one or more antenna assembly configuration parameters comprises:
circuitry configured for controlling one or more of at least one communication timing or at least one beam attribute of at least one other portable wireless node.

27. The system of claim 1, wherein circuitry configured for controlling at least one characteristic of the at least one antenna assembly configuration parameter architecture at least partially based on the one or more antenna assembly configuration parameters comprises:
circuitry configured for controlling at least one characteristic of the at least one antenna assembly configuration parameter architecture at least partially based on the one or more antenna assembly configuration parameters and at least partially based on at least one portable wireless node velocity aspect.

28. The system of claim 27, wherein circuitry configured for controlling at least one characteristic of the at least one antenna assembly configuration parameter architecture at least partially based on the one or more antenna assembly configuration parameters and at least partially based on at least one portable wireless node velocity aspect comprises:

circuitry configured for altering the selected at least one frequency for the at least one anticipated communication at least partially based on a determination that the at least one cooperative portable wireless node is substantially stationary.

29. The system of claim 1, wherein circuitry configured for controlling at least one characteristic of the at least one antenna assembly configuration parameter architecture at least partially based on the one or more antenna assembly configuration parameters comprises:
circuitry configured for determining at least one direction to aim at least one beam at a particular portable wireless node based at least partly on transmissions of multiple beams having multiple respective indicators.

30. The system of claim 1, wherein circuitry configured for controlling at least one characteristic of the at least one antenna assembly configuration parameter architecture at least partially based on the one or more antenna assembly configuration parameters comprises:
circuitry configured for determining at least one direction to aim at least one beam at a particular portable wireless node based at least partly on sweeping beam transmissions along a horizontal path and slicing beam transmissions along a vertical path.

31. The system of claim 1, wherein the circuitry configured for receiving, the circuitry configured for identifying, the circuitry configured for selecting, the circuitry configured for sharing, and the circuitry configured for controlling are effected within the system.

32. The system of claim 1, wherein the circuitry configured for receiving, the circuitry configured for identifying, the circuitry configured for selecting, the circuitry configured for sharing, and the circuitry configured for controlling are effected within at least one other node.

33. The system of claim 1, further comprising:
circuitry configured for facilitating the at least one anticipated communication utilizing the selected at least one frequency for the at least one anticipated communication subsequent to the controlling of the at least one characteristic of the at least one antenna assembly configuration parameter at least partially based on the one or more antenna assembly configuration parameters shared with the at least one cooperative portable wireless node via the at least one frequency other than the selected at least one frequency for the at least one anticipated communication.

34. The system of claim 1, wherein circuitry configured for sharing one or more antenna assembly configuration parameters with the at least one cooperative portable wireless node via at least one frequency other than the selected at least one frequency for the at least one anticipated communication comprises:
circuitry configured for sharing one or more antenna assembly configuration parameters with the at least one cooperative portable wireless node via at least one frequency outside of at least one frequency band matching at least one antenna of the at least one antenna assembly configuration parameter architecture.

35. The system of claim 1, wherein circuitry configured for sharing one or more antenna assembly configuration parameters with the at least one cooperative portable wireless node via at least one frequency other than the selected at least one frequency for the at least one anticipated communication comprises:
circuitry configured for sharing one or more antenna assembly configuration parameters with the at least one cooperative portable wireless node via at least one frequency outside of at least one frequency band matching at least one antenna of the at least one antenna assembly configuration parameter architecture, the at least one frequency band matching the at least one antenna of the at least one antenna assembly configuration parameter architecture including at least the selected at least one frequency for the at least one anticipated communication; and
wherein circuitry configured for controlling at least one characteristic of the at least one antenna assembly configuration parameter architecture at least partially based on the one or more antenna assembly configuration parameters includes at least:
circuitry configured for controlling at least one characteristic of the at least one antenna assembly configuration parameter architecture at least partially based on the one or more antenna assembly configuration parameters; and
circuitry configured for facilitating the at least one anticipated communication utilizing the selected at least one frequency for the at least one anticipated communication.

36. The system of claim 1, wherein circuitry configured for receiving at least one indication of at least one anticipated communication comprises:
circuitry configured for detecting loss of at least one directionality of the antenna assembly configuration parameter architecture, the loss of at least one directionality of the antenna assembly configuration parameter architecture associated with reduced ability to communicate wirelessly with the at least one cooperative portable wireless node at a throughput associated with at least one frequency band matching at least one antenna of the at least one antenna assembly configuration parameter architecture.

37. The system of claim 36, wherein circuitry configured for detecting loss of at least one directionality of the antenna assembly configuration parameter architecture, the loss of at least one directionality of the antenna assembly configuration parameter architecture associated with reduced ability to communicate wirelessly with the at least one cooperative portable wireless node at a throughput associated with at least one frequency band matching at least one antenna of the at least one antenna assembly configuration parameter architecture comprises:
circuitry configured for adjusting at least one frequency to at least one frequency outside the at least one frequency band matching at least one antenna of the at least one antenna assembly configuration parameter architecture to adjust the antenna assembly configuration parameter architecture via the adjusted at least one frequency outside the at least one frequency band matching at least one antenna of the at least one antenna assembly configuration parameter architecture in response to detecting the loss of the at least one directionality of the antenna assembly configuration parameter architecture.

38. The system of claim 1, wherein circuitry configured for selecting at least one frequency for the at least one anticipated communication at least partially based on at least one wavelength of at least one antenna associated with the antenna assembly configuration parameter architecture comprises:
circuitry configured for selecting at least one frequency for the at least one anticipated communication at least partially via matching the at least one frequency with at least one related wavelength of at least one antenna associated with the antenna assembly configuration parameter architecture.

39. The system of claim 38, wherein circuitry configured for selecting at least one frequency for the at least one anticipated communication at least partially via matching the at least one frequency with at least one related wavelength of at least one antenna associated with the antenna assembly configuration parameter architecture comprises:
   circuitry configured for selecting at least one frequency for the at least one anticipated communication at least partially via matching the at least one frequency with at least one wavelength of one or more of at least one half-wave antenna, at least one quarter-wave antenna, or at least one eighth-wave antenna associated with the antenna assembly configuration parameter architecture.

40. The system of claim 1, wherein circuitry configured for selecting at least one frequency for the at least one anticipated communication at least partially based on at least one wavelength of at least one antenna associated with the antenna assembly configuration parameter architecture comprises:
   circuitry configured for selecting at least one first frequency, the at least one first frequency intended for the at least one anticipated communication and matched with the at least one related wavelength of the at least one antenna associated with the antenna assembly configuration parameter architecture; and
   wherein circuitry configured for sharing one or more antenna assembly configuration parameters with the at least one cooperative portable wireless node via at least one frequency other than the selected at least one frequency for the at least one anticipated communication includes at least:
      circuitry configured for sharing the one or more antenna assembly configuration parameters with the at least one cooperative portable wireless node via at least one second frequency, the at least one second frequency other than the at least one first frequency and unmatched with the at least one related wavelength of the at least one antenna associated with the antenna assembly configuration parameter architecture.

41. A method, comprising:
   receiving at least one indication of at least one anticipated communication;
   identifying at least one cooperative portable wireless node to participate in an antenna assembly configuration parameter architecture in association with the at least one anticipated communication;
   selecting at least one frequency for the at least one anticipated communication at least partially based on at least one wavelength of at least one antenna associated with the antenna assembly configuration parameter architecture;
   sharing one or more antenna assembly configuration parameters with the at least one cooperative portable wireless node via at least one frequency other than the selected at least one frequency for the at least one anticipated communication; and
   controlling at least one characteristic of the at least one antenna assembly configuration parameter architecture at least partially based on the one or more antenna assembly configuration parameters.

42. A system, comprising:
   a computing device; and
   one or more instructions which, when executed by the computing device, cause the computing device to perform one or more operations including at least:
      receiving at least one indication of at least one anticipated communication;
      identifying at least one cooperative portable wireless node to participate in an antenna assembly configuration parameter architecture in association with the at least one anticipated communication;
      selecting at least one frequency for the at least one anticipated communication at least partially based on at least one wavelength of at least one antenna associated with the antenna assembly configuration parameter architecture;
      sharing one or more antenna assembly configuration parameters with the at least one cooperative portable wireless node via at least one frequency other than the selected at least one frequency for the at least one anticipated communication; and
      controlling at least one characteristic of the at least one antenna assembly configuration parameter architecture at least partially based on the one or more antenna assembly configuration parameters.

* * * * *